(12) United States Patent
Kimura et al.

(10) Patent No.: US 11,027,454 B2
(45) Date of Patent: Jun. 8, 2021

(54) METHOD FOR PRODUCING CERAMIC SINTERED BODY, AND METHOD AND DEVICE FOR PRODUCING CERAMIC MOLDED BODY

(71) Applicants: Japan Fine Ceramics Center, Nagoya (JP); NORITAKE CO., LIMITED, Nagoya (JP); TOTO LTD., Kitakyushu (JP); NGK INSULATORS, LTD., Nagoya (JP); NGK SPARK PLUG CO., LTD., Nagoya (JP)

(72) Inventors: Teiichi Kimura, Nagoya (JP); Satoshi Suehiro, Nagoya (JP)

(73) Assignees: Japan Fine Ceramics Center, Nagoya (JP); NORITAKE CO., LIMITED, Nagoya (JP); TOTO LTD., Kitakyushu (JP); NGK INSULATORS, LTD., Nagoya (JP); NGK SPARK PLUG CO., LTD., Nagoya (JP)

( * ) Notice: Subject to any disclaimer, the term of this patent is extended or adjusted under 35 U.S.C. 154(b) by 181 days.

(21) Appl. No.: 16/074,683

(22) PCT Filed: Feb. 2, 2017

(86) PCT No.: PCT/JP2017/003859
§ 371 (c)(1),
(2) Date: Aug. 1, 2018

(87) PCT Pub. No.: WO2017/135387
PCT Pub. Date: Aug. 10, 2017

(65) Prior Publication Data
US 2019/0054653 A1  Feb. 21, 2019

(30) Foreign Application Priority Data

Feb. 5, 2016  (JP) .............................. JP2016-021264
Feb. 5, 2016  (JP) .............................. JP2016-021265
(Continued)

(51) Int. Cl.
*B28B 1/00* (2006.01)
*B28B 1/32* (2006.01)
(Continued)

(52) U.S. Cl.
CPC ................ *B28B 1/001* (2013.01); *B28B 1/32* (2013.01); *C04B 35/10* (2013.01); *C04B 35/111* (2013.01);
(Continued)

(58) Field of Classification Search
CPC ............ B28B 1/001; B28B 1/32; C04B 35/10
See application file for complete search history.

(56) References Cited

U.S. PATENT DOCUMENTS

| 5,204,055 A | 4/1993 | Sachs et al. |
| 2005/0257740 A1 | 11/2005 | Hoshino et al. |

(Continued)

FOREIGN PATENT DOCUMENTS

| CN | 101682937 A | 3/2010 |
| CN | 102173810 A | 9/2011 |

(Continued)

OTHER PUBLICATIONS

Combined Taiwanese Office Action and Search Report dated Apr. 22, 2020 in Patent Application No. 106103721 (with English translation), 10 pages.
(Continued)

*Primary Examiner* — Joseph S Del Sole
*Assistant Examiner* — Yung-Sheng M Tsui
(74) *Attorney, Agent, or Firm* — Oblon, McClelland, Maier & Neustadt, L.L.P.

(57) ABSTRACT

The present invention is a sintering method of a ceramic for sintering characterized by forming a layer containing a carbon powder on a surface of an article consisting of a ceramic for sintering, and then irradiating with laser a surface of the carbon powder-containing layer of a lamination obtained.

6 Claims, 13 Drawing Sheets

(30) Foreign Application Priority Data

| Dec. 28, 2016 | (JP) | JP2016-256687 |
|---|---|---|
| Dec. 28, 2016 | (JP) | JP2016-256688 |
| Jan. 25, 2017 | (JP) | JP2017-011533 |

(51) Int. Cl.

| C04B 35/64 | (2006.01) |
|---|---|
| C04B 41/50 | (2006.01) |
| C04B 41/00 | (2006.01) |
| C04B 35/622 | (2006.01) |
| C04B 35/111 | (2006.01) |
| C04B 35/58 | (2006.01) |
| C04B 35/10 | (2006.01) |
| C04B 41/45 | (2006.01) |
| C04B 41/87 | (2006.01) |

(52) U.S. Cl.
CPC ........ *C04B 35/58* (2013.01); *C04B 35/62218* (2013.01); *C04B 35/62222* (2013.01); *C04B 35/64* (2013.01); *C04B 41/009* (2013.01); *C04B 41/0036* (2013.01); *C04B 41/4578* (2013.01); *C04B 41/5001* (2013.01); *C04B 41/5031* (2013.01); *C04B 41/87* (2013.01); C04B 2235/3217 (2013.01); C04B 2235/5436 (2013.01); C04B 2235/5445 (2013.01); C04B 2235/60 (2013.01); C04B 2235/6026 (2013.01); C04B 2235/656 (2013.01); C04B 2235/665 (2013.01)

(56) References Cited

U.S. PATENT DOCUMENTS

| 2007/0183918 | A1 | 8/2007 | Monsheimer et al. | |
|---|---|---|---|---|
| 2007/0235157 | A1 | 10/2007 | Bunker et al. | |
| 2008/0000610 | A1 | 1/2008 | Bunker et al. | |
| 2008/0083723 | A1 | 4/2008 | Tsukamoto et al. | |
| 2010/0078424 | A1 | 4/2010 | Tsukamoto et al. | |
| 2014/0314613 | A1 | 10/2014 | Hopkinson et al. | |
| 2015/0050463 | A1 | 2/2015 | Nakano et al. | |
| 2016/0325356 | A1 | 11/2016 | Hirata et al. | |
| 2017/0313050 | A1* | 11/2017 | DeFelice | B28B 1/001 |

FOREIGN PATENT DOCUMENTS

| CN | 103842157 A | | 6/2014 | |
|---|---|---|---|---|
| CN | 104556980 A | | 4/2015 | |
| DE | 103 06 910 A1 | | 9/2004 | |
| EP | 1 547 991 A1 | | 6/2005 | |
| JP | H1-184218 A | | 7/1989 | |
| JP | 2-296778 A | | 12/1990 | |
| JP | 6-218712 A | | 8/1994 | |
| JP | 2001-073726 A | | 3/2001 | |
| JP | 2001-185439 A | | 7/2001 | |
| JP | 2002241179 A | * | 8/2002 | |
| JP | 2004-315307 A | | 11/2004 | |
| JP | 2006-41134 A | | 2/2006 | |
| JP | 2006-104058 A | | 4/2006 | |
| JP | 2006199580 A | * | 8/2006 | |
| JP | 2007-529340 A | | 10/2007 | |
| JP | 2007-327851 A | | 12/2007 | |
| JP | 2008-47445 A | | 2/2008 | |
| JP | 2008-308374 A | | 12/2008 | |
| JP | 2010-219114 A | | 9/2010 | |
| JP | 2011-143361 A | | 7/2011 | |
| JP | 2012-067205 A | | 4/2012 | |
| JP | 2014-516000 A | | 7/2014 | |
| JP | 2014-527481 A | | 10/2014 | |
| JP | 2015-38237 A | | 2/2015 | |
| JP | 2015038237 A | * | 2/2015 | ............ B33Y 50/02 |
| JP | 2015-105201 A | | 6/2015 | |
| JP | 2015-205485 A | | 11/2015 | |
| WO | WO 2008/081939 A1 | | 7/2008 | |

OTHER PUBLICATIONS

Extended European Search Report dated Nov. 7, 2019 in Patent Application No. 17747538.1, 15 pages.
Partial Supplementary European Search Report dated Aug. 8, 2019 in European Patent Application No. 17747538.1, 13 pages.
Juste, E. et al., "Shaping of ceramic parts by selective laser melting of powder bed", Journal of Materials Research, XP055431299, vol. 29, No. 17, Jul. 7, 2014, pp. 2086-2094.
Wu, Y. et al. "Laser densification of alumina powder beds generated using aerosol assisted spray deposition", Journal of the European Ceramic Society, XP022282243, vol. 27, No. 16, Oct. 15, 2007, pp. 4727-4735.
International Search Report dated Apr. 18, 2017, in PCT/JP2017/003859, filed Feb. 2, 2017.
Japanese Office Action dated Dec. 1, 2020 in Japanese Patent Application No. 2016-256688 (with English translation), 6 pages.
Extended European Search Report dated Aug. 12, 2020 in Patent Application No. 20176252.3, 7 pages.
Office Action dated Sep. 29, 2020, in Chinese Application No. 201780009909.5 (w/ Computer-generated English translation).
Japanese Office Action dated Aug. 4, 2020 in Japanese Patent Application No. 2016-256687 (with unedited computer generated English translation), 6 pages.
Office Action dated Apr. 20, 2021 in Japanese Patent Application No. 2016-256688, (w/ computer-generated English translation).

* cited by examiner (A)　　　(B)　　　(C)　　　(D)

METHOD FOR PRODUCING CERAMIC SINTERED BODY, AND METHOD AND DEVICE FOR PRODUCING CERAMIC MOLDED BODY

TECHNICAL FIELD

The present invention relates to a sintering method of a ceramic for sintering, and a production method of a sintered material using the same. The present invention also relates to a method for efficiently producing a ceramic compact having high filling density of a ceramic particle, and a production apparatus of a ceramic compact used for the method.

BACKGROUND ART

When producing, for example, a plate-like ceramic sintered compact, there is a method in which a slurry, a paste, or a powder prepared by mixing a ceramic particle and a binder solution wherein a polymer binder is dissolved in a medium, is subjected to press molding, slurry casting, injection molding, extrusion molding, screen printing, or the like, and then baking treatment is conducted. Among these, a method for producing a ceramic sintered compact on a substrate is disclosed in Patent Document 1, and a production method of a sheet-like ceramic disclosed is a method in which a ceramic slurry composition that contains a water-soluble binder, a ceramic powder and water, and has a solid ratio by volume of 2% or more and no more than 5% is flowcasted on a support to form into a sheet, the ceramic slurry is dried, degreased, and baked.

In recent years, the development of methods for producing a shaped article as a three-dimensional model has been proposed in various fields. For example, conventionally disclosed in Patent Document 2 is a method for producing a component including a step (1) of depositing a first layer of a powder material in a limited region and a step (2) of applying a binding agent material to a region selected on the powder material layer and forming a first layer of the powder material joined in a selected region, and a step of repeating steps (1) and (2) in a selected number of times to form a selected number of continuous layers for forming a component having a selected region in the powder material joined and removing an unjoined powder material from continuous layers for forming a component. A powder laminating forming method is disclosed in Patent Document 3, including a step of forming a thin layer of a powder material, a step of forming a preheated layer at elevated temperatures by irradiating with heating energy beam a specific region of the thin layer of the powder material, and a step of forming a solidified layer by irradiating with heating energy beam the thin layer of the powder material in the region of the preheated layer at elevated temperatures, and melting and solidifying the thin layer of the powder material, and repeating these steps to produce a laminated shaped article. Further, a sintering shaping method is disclosed in Patent Document 4, including a step of forming a molded layer using a sintered molded material containing a first inorganic particle, a step of imparting a liquid binding agent containing a second inorganic particle in a desired region of the molded layer, a step of forming a molded cross-sectional layer by curing the liquid binding agent imparted and a step of removing a region where no liquid binding agent of the molded layer is imparted, and a step of sintering the molded cross-sectional layer by heating the same.

PRIOR TECHNICAL DOCUMENT

Patent Document

[PATENT DOCUMENT 1] JP-A 2004-315307
[PATENT DOCUMENT 2] JP-A H6-218712
[PATENT DOCUMENT 3] JP-A 2015-38237
[PATENT DOCUMENT 4] JP-A 2015-205485

SUMMARY OF THE INVENTION

Problems that the Invention is to Solve

Direct laser irradiation onto a ceramic for sintering fails to achieve sufficient sintering. For example, sintering in depth direction essentially involves long-time irradiation.

The present invention has an object to provide a method for efficiently sintering a ceramic for sintering, a method for efficiently producing an article whose sintered part corresponds to a desired part of a non-sintered part (hereinafter, referred to as "sintered material", whether a sintered part is part or all of the non-sintered part) in the article, the non-sintered part consisting of a ceramic for sintering (hereinafter, referred to as "raw article"), and a method for efficiently producing a three-dimensional sintered material (hereinafter, referred to as "shaped article").

In addition, when a slurry is applied to a substrate and a film-coated substrate is heated to produce a ceramic compact, the ceramic compact needs heating at a temperature of 400° C. or higher to remove a binder component, which is unfortunately not an economical.

The present invention has another object to provide a method for efficiently producing a ceramic compact having high filling density of a ceramic particle at low costs using a ceramic slurry containing no polymer binder and a production apparatus of a ceramic compact used for the method.

Furthermore, when a slurry is applied to a substrate and a film-coated substrate is uniformly heated to remove a binder and a medium from a coating film, a ceramic compact obtained unfortunately demonstrated such problems as degradation of dimensional accuracy, warping, and cracks (see FIG. 25).

The present invention has another object to provide a method for efficiently producing a ceramic compact in a method for producing a ceramic compact degreased on a substrate using a slurry containing a ceramic particle and a polymer binder having controlled deformation over the surface of the substrate and controlled generation of cracks, and a production apparatus of a ceramic compact used for the method.

Means for Solving the Problems

In the present invention, the sintering method of a ceramic for sintering is a method which is characterized by forming a layer containing a carbon powder on a surface of an article consisting of a ceramic for sintering, and then irradiating with laser a surface of the carbon powder-containing layer of a lamination obtained.

In the present invention, the production method of an article having a sintered part is a method which is characterized by including a process in which a layer containing a carbon powder is formed on a surface of a non-sintered part of an article having the non-sintered part consisting of a ceramic for sintering, and a process in which a laser is applied to a surface of the powder-containing layer of a lamination obtained to sinter the ceramic for sintering located on a base side of an irradiated part, sequentially.

In the present invention, the production method of an article (shaped article) having a three-dimensional sintered part is a method which is characterized in that the method includes a first process in which a layer containing a carbon powder is formed on a surface of a non-sintered part of an article having the non-sintered part consisting of a ceramic for sintering, and a second process in which a laser is applied to a surface of the powder-containing layer of a lamination obtained to sinter the ceramic for sintering located on a base side of an irradiated part, sequentially, and subsequently a third process in which a non-sintered part consisting of a ceramic for sintering is formed on a sintered part, and that the first process and the second process are repeatedly conducted after the third process.

It is preferable that the lamination is irradiated with the laser while scanning the laser or changing an optical path via a light diffusion lens with the lamination secured, or irradiated with the laser with an optical path secured while moving the lamination in the second process.

It is preferable that the third process includes a procedure in which a slurry containing a particle of the ceramic for sintering and a dispersion medium is sprayed on the surface of the sintered part in a state where the article including the sintered part is heated.

In the present invention, the production method of a ceramic compact is a method which is characterized in that the method includes a process for spraying a surface of a heated substrate with a slurry containing a ceramic particle and a dispersion medium, and having a ceramic particle concentration from 5% to 80% by volume. Hereinafter, this invention is referred to as "production method of a ceramic compact in the first embodiment".

In the present invention, the production apparatus of a ceramic compact utilizing the production method of a ceramic compact in the first embodiment is characterized by including a slurry spraying part for spraying a substrate with a slurry comprising a ceramic particle and a dispersion medium, and a substrate heating part for heating the substrate.

In the present invention, the other production method of a ceramic compact is a method which is characterized by including a coating process in which a slurry comprising a ceramic particle and a polymer binder is coated to a surface of a substrate, and a degreasing process in which a film-coated substrate obtained in the coating process is heated from a lower side of the film-coated substrate to degrease the coat, characterized in that the lower surface of the film-coated substrate is non-uniformly heated in the degreasing process. Hereinafter, this invention is referred to as "production method of a ceramic compact in the second embodiment".

In the present invention, the production apparatus of a ceramic compact utilizing the production method of a ceramic compact in the second embodiment is characterized in that the production apparatus includes a heat-treating part which places a film-coated substrate formed by applying a slurry containing a ceramic particle and a polymer binder to a surface of a substrate and then heats the film-coated substrate from a lower side thereof, and that the heat-treating part has a protrusion in point contact with or in line contact with a substrate part of the film-coated substrate.

Effects of the Invention

According to the sintering method of the present invention, a ceramic for sintering can be sintered for a shorter period of time than direct laser irradiation. In particular, this method can efficiently achieve sintering from the surface up to approximately 300 μm in depth direction. Accordingly, a sintered material whose sintered part corresponds to a desired part in a non-sintered part consisting of a ceramic for sintering, or a shaped article can be efficiently produced.

According to the production method of a ceramic compact in the first embodiment, a ceramic compact having high filling density of a ceramic particle can be efficiently produced while setting a substrate temperature of under 400° C.

According to the production method of a ceramic compact in the second embodiment, a ceramic compact consisting of a ceramic particle, namely, a ceramic compact in which deformation is suppressed and crack generation is also suppressed can be efficiently produced on a substrate.

BRIEF DESCRIPTION OF THE DRAWINGS

FIGS. 18 (A) and (B) illustrate a heat source whose protrusion pattern forms a point, and FIGS. 18 (C) and (D) illustrate a heat source whose protrusion pattern forms a combination of lines;

EMBODIMENTS FOR CARRYING OUT THE INVENTION

The sintering method of the present invention is characterized by forming a layer containing a carbon powder on a surface of an article consisting of a ceramic for sintering, and then irradiating with laser a surface of the carbon powder-containing layer of a lamination obtained.

Hereinafter, the method will be described with reference to FIG. 1.

Figure 1:
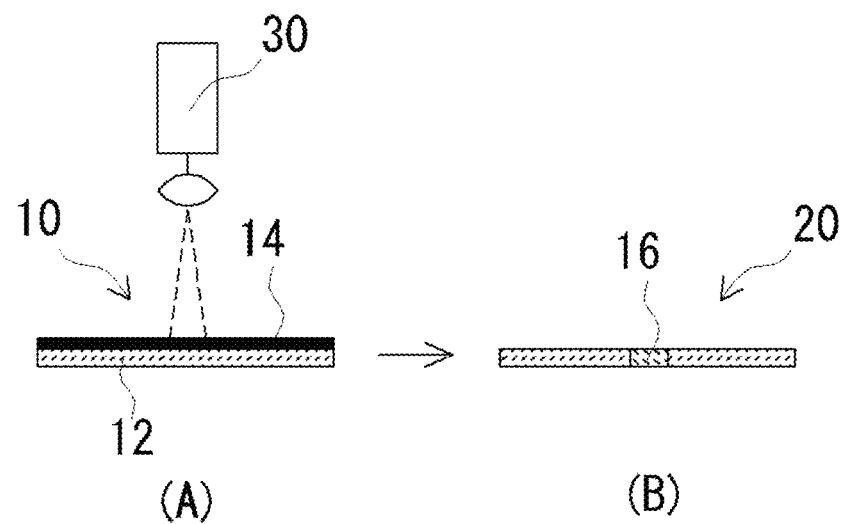
FIG. 1 is a schematic cross-sectional view showing one example of a sintering method in the present invention and a production method of a sintered material in the present invention.

FIG. 1 (A) is an explanatory view illustrating that a carbon powder-containing layer 14 formed on a surface of an article 12 consisting of a ceramic for sintering is irradiated with laser at a predetermined position thereof, FIG. 1 (B) is an explanatory view illustrating that a ceramic for sintering on the base side of a laser irradiation part in the carbon powder-containing layer 14 is sintered to form a sintered part 16. When the carbon powder-containing layer 14 of a lamination 10 is irradiated with laser, a carbon powder absorbs laser energy to generate heat and at the same time the carbon powder instantly loses at the laser irradiation part. Then, a ceramic for sintering on the base side is preheated at a temperature of 800° C. or higher (estimated temperature), and a loss part (exposed part of ceramic for sintering in article 12) further receives laser to cause temperature rise, sintering and form the sintered part 16. The sintered part 16 in FIG. 1 (B) is sintered from one side to the other side, but according to the thickness of the article 12 and laser irradiation conditions, only the surface layer may be a sintered part 16.

A ceramic for sintering constituting the article 12 is preferably an oxide, a nitride, an oxynitride, and the like. Among these, the material may be one type or two or more types thereof.

Examples of the oxide to be used include aluminum oxide, mullite, magnesium oxide, zinc oxide, titanium oxide, iron oxide, yttrium oxide, zirconium oxide, barium titanate, and the like.

Examples of the nitride to be used include silicon nitride, aluminum nitride, titanium nitride, zirconium nitride, tantalum nitride, iron nitride, and the like.

Examples of the oxynitride to be used include sialon, silicon oxynitride, and the like.

The article 12 preferably consists of a group of ceramic for sintering particles. In this case, a shape and diameter of the particle are not particularly limited. The particle shape may be spherical, ellipsoid, polyhedral, linear, plate-like, or indefinite as a solid body. An average particle diameter is preferably in a range from 10 nm to 100 µm, and more preferably from 100 nm to 10 µm. A density of particles contained in the article 12 is preferably 40% or more by volume, and more preferably 70% or more by volume from a viewpoint of the strength of a sintered part formed and sintering time.

The shape of the article 12 is not particularly limited, but may be a plate, a curved plate, a bar, a cylinder, a lump, or a combination thereof or a deformed shape thereof.

A forming method of a carbon powder-containing layer 14 on the surface of the article 12 is not particularly limited. When a carbon powder only, or a composition containing a carbon powder and a binder, or a composition containing a carbon powder and an organic solvent is used and a spraying method with a spray, a printing method such as screen printing, a coating method with a doctor blade, a spin-coating method, or a curtain coater method it conducted to form a carbon powder-containing layer 14 at (part or all of) a desired position on the surface of the article 12. A content of the carbon powder in the carbon powder-containing layer 14 is preferably 50% or more by mass, and more preferably 80% or more by mass from a viewpoint of smooth sintering property.

A thickness of the carbon powder-containing layer 14 is not particularly limited, but is preferably in a range from 5 nm to 30 µm, and more preferably from 100 nm to 10 µm from a viewpoint of smooth sintering property.

When the carbon powder-containing layer 14 is irradiated with laser, the laser having a wavelength of 500 nm to 11 µm is preferably used from a viewpoint of smooth sintering property. For example, Nd:YAG laser, Nd:YVO laser, Nd:VLF laser, titanium-sapphire laser, carbon dioxide laser, and the like can be used.

Laser irradiation condition is appropriately selected according to a type of ceramic for sintering, sintering area, sintering depth, and so on. A laser output is preferably in a range from 50 to 2000 W/cm$^2$, and more preferably from 100 to 500 W/cm$^2$ from a viewpoint of smooth sintering property. An irradiation time is preferably in a range from one second to 60 minutes, and more preferably from 5 seconds to 30 minutes.

When the carbon powder-containing layer 14 is irradiated with laser, the atmosphere is not particularly limited and may be ambient air, nitrogen, argon, helium, or the like. The article 12 or the carbon powder-containing layer 14 may be preheated before laser irradiation. A preheating temperature is preferably 300° C. or higher, and more preferably 400° C. or higher. The upper limit is normally a temperature lower than the melting point of the ceramic for sintering by 200° C. or more. The preheating method is not particularly limited. An infrared lamp, a halogen lamp, resistance heating, high-frequency induction heating, or microwave heating may be employed.

When an entire surface of the carbon powder-containing layer 14 of the lamination 10 is irradiated with laser, the entire surface on the base side of the laser irradiation part of the carbon powder-containing layer 14 can be defined as a sintered part 16. Accordingly, when the article 12 is sintered in large area, a method for irradiating the lamination 10 with laser while scanning the laser or changing the optical path via light diffusion lens with the lamination 10 secured or a method for irradiating the lamination 10 with laser with the optical path secured while moving the lamination 10 can be employed.

When not only the carbon powder-containing layer 14 of the lamination 10, but also a ceramic for sintering in which a carbon powder-containing layer is not formed is irradiated with laser, sintering can sufficiently be achieved in depth direction as the total energy amount increases. However, a time required for sintering the surface layer up to the same depth, or a time for sintering the entire cross-sectional part from one side to the other side on the base side of the laser irradiation part of the carbon powder-containing layer significantly varies. The method of the present invention is advantageously useful in that it can be achieved in a shorter period of time than a method for irradiating with laser a ceramic for sintering in which a carbon powder-containing layer is not formed.

When the above laser irradiation condition is employed in e.g., a plate-like lamination 10, sintering can efficiently be achieved from the surface to approximately 300 μm in depth direction. Consequently, even in a method for irradiating the lamination 10 with laser while scanning the laser or changing the optical path via light diffusion lens with the lamination 10 secured or a method for irradiating the lamination 10 with the laser with the optical path secured while moving the lamination, sintering can be achieved at a specific part from the surface up to a desired depth.

The production method of a sintered material of the present invention includes a process in which a layer containing a carbon powder is formed on a surface of a non-sintered part of an article (raw article) having the non-sintered part consisting of a ceramic for sintering, and a process in which a laser is applied to a surface of the powder-containing layer of a lamination obtained to sinter the ceramic for sintering located on a base side of an irradiated part, sequentially. A ceramic for sintering constituting the non-sintered part in a raw article may be, as described above, an oxide, a nitride, an oxynitride, and the like. A forming method of a carbon powder-containing layer on the surface of the non-sintered part in a raw article, and a laser irradiation method (type of laser, wavelength, irradiation condition, and the like) are also described above.

Figure 2:
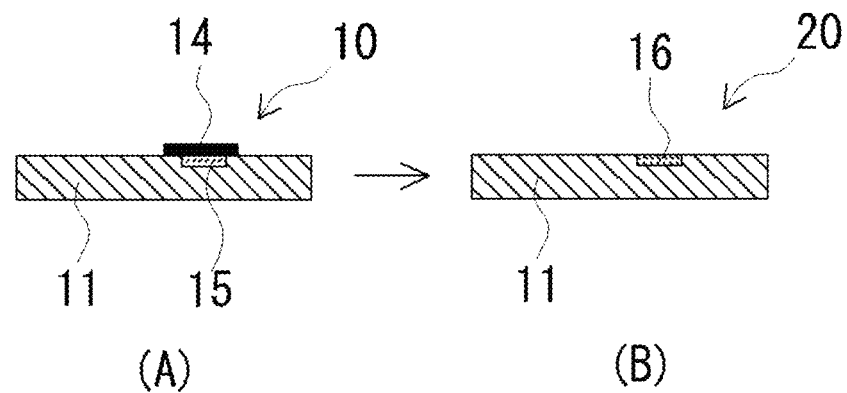
FIG. 2 is a schematic cross-sectional view of another example of a production method of a sintered material in the present invention.

The present invention can produce not only a sintered material 20 by the method shown in FIG. 1, but also, for example, a sintered material 20 by the method shown in FIG. 2.

FIG. 2 (A) is an explanatory view illustrating laser irradiation (from a light source not shown) onto a carbon powder-containing layer 14 of a lamination 10 in which the carbon powder-containing layer 14 is arranged on a surface of a non-sintered part 15 consisting of a ceramic for sintering filled and formed in a concave part in an article 11 consisting of a material other than the ceramic for sintering. FIG. 2 (B) is an explanatory view illustrating that the non-sintered part 15 is sintered due to energy of laser with which the non-sintered part 15 is irradiated through a carbon powder-containing layer 14 to form a sintered part 16.

As described above, the present invention can efficiently produce a sintered material. The present invention can also produce an article having a three-dimensional sintered part. When such an article is produced, a method for scanning laser in a carbon powder-containing layer 14 while changing the energy in the non-sintered part 15 on the base side of the carbon powder-containing layer 14 of the lamination 10 can be employed.

Next, the method for producing a shaped article of the invention is characterized in that the method includes a first process in which a layer containing a carbon powder is formed on a surface of a non-sintered part of an article (raw article) having the non-sintered part consisting of a ceramic for sintering, and a second process in which a laser is applied to a surface of the powder-containing layer of a lamination obtained to sinter the ceramic for sintering located on a base side of an irradiated part, sequentially, and subsequently a third process in which a non-sintered part consisting of a ceramic for sintering is formed on a sintered part, and that the first process and the second process are repeatedly conducted after the third process.

Hereinafter, the method will be described with reference to FIGS. 3, 4, and 5.

Figure 3:
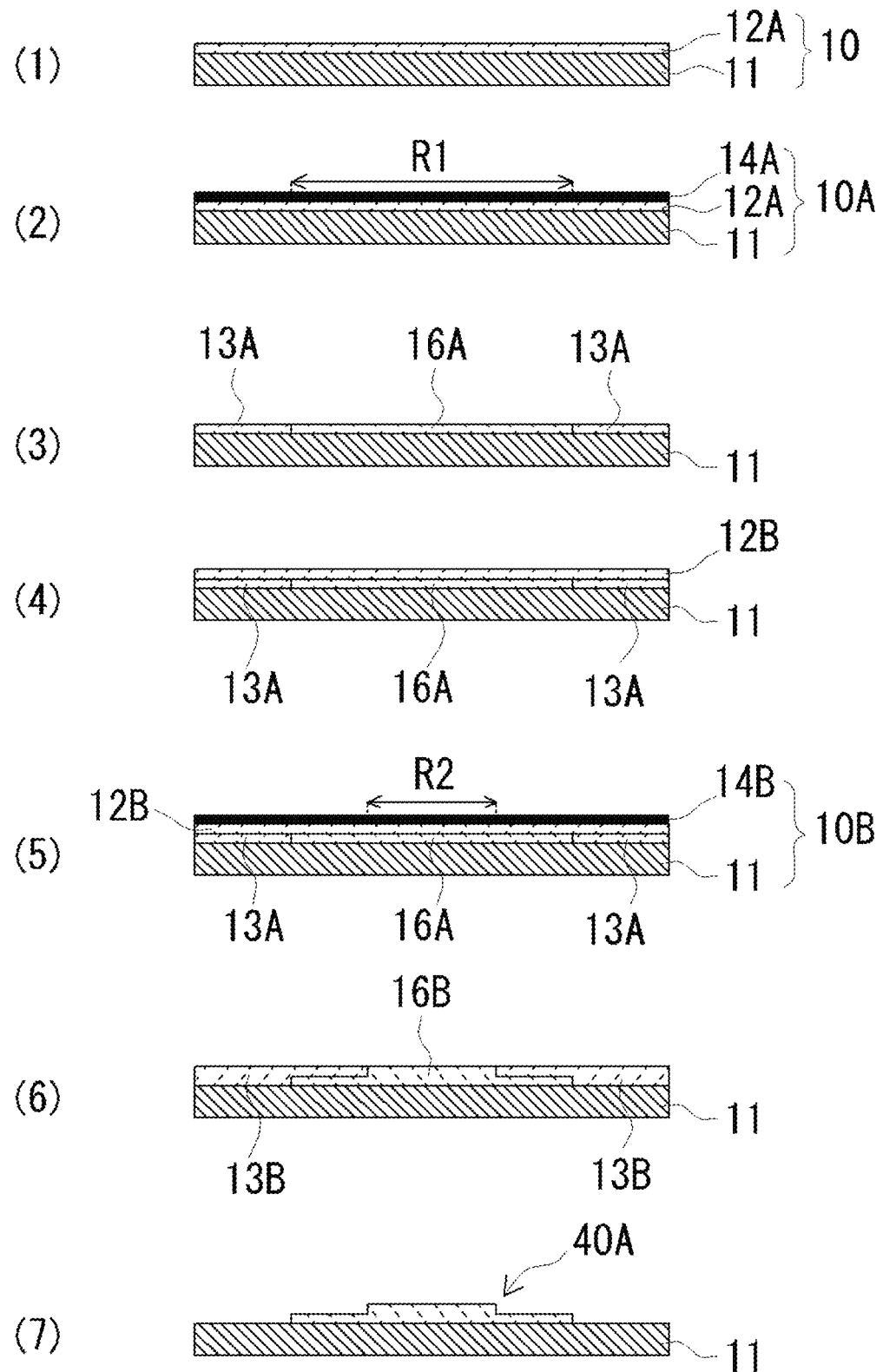
FIG. 3 is a schematic cross-sectional view showing one example of a production method of a shaped article in the present invention.

FIG. 3 is a schematic illustration explaining a method for producing a three-dimensional shaped article 40A shown in FIG. 3 (7).

FIG. 3 (1) is a cross-sectional view showing a plate-like raw article 10, including a base 11 consisting of the plate-like substrate and a non-sintered part (non-sintered layer) 12A consisting of a ceramic for sintering formed on one surface side of the base 11. The substrate constituting the base 11 is preferably consisting of at least one type selected from a metal, an alloy, and a ceramic. The non-sintered part (non-sintered layer) 12A can be formed by a conventionally known method such as spraying method, electron-beam physical vapor deposition method, laser chemical vapor deposition method, cold spray method, and a method for applying a slurry containing a ceramic for sintering particle, a dispersion medium, and as required, a polymer binder, drying and then degreasing the same. The base 11 and the non-sintered part (non-sintered layer) 12A may be joined, or the non-sintered part (non-sintered layer) 12A may be placed on the base 11 without joining them.

First, the raw article 10 is subjected to a first process to form a carbon powder-containing layer 14A on a surface of the non-sintered part (non-sintered layer) 12A to obtain a lamination 10A (see FIG. 3 (2)). In the first process, the above-mentioned method for forming a carbon powder-containing layer can be employed. Then, the lamination 10A is subjected to a second process, a region R1 shown in FIG. 3 (2) is irradiated with laser to sinter a ceramic for sintering from a surface of the non-sintered part (non-sintered layer) 12A to the base 11 in depth direction to form a sintered part (sintered layer) 16A (see FIG. 3 (3)). In the second process, the above-mentioned laser irradiation method (type of laser, wavelength, irradiation condition, and the like) can be employed, and the method may be to irradiate the lamination 10A with laser while scanning the laser or changing the optical path via a light diffusion lens with the lamination 10A secured, or irradiate with the laser with the optical path secured while moving the lamination 10A. Soon after the second process, a residual carbon powder-containing layer (carbon powder-containing layer around region R1 in FIG. 3 (2)) is found on the surface of a non-sintered part 13A in FIG. 3 (3), but in FIG. 3 (3), this description is not provided.

Subsequently, the sintered material in FIG. 3 (3) is subjected to a third process to form a non-sintered part (non-sintered layer) 12B consisting of a ceramic for sintering on a surface of at least a sintered part (sintered layer) 16A of the sintered material (see FIG. 3 (4)). The ceramic for sintering used in the third process may be the same or different ceramic for sintering consisting of a non-sintered part (non-sintered layer) 12A. The non-sintered part (non-sintered layer) 12B may be formed in the same manner as a case for the non-sintered part (non-sintered layer) 12A. When a slurry containing a particle of a ceramic for sintering and a dispersion medium is sprayed onto a surface of a sintered part (sintered layer) 16A and a non-sintered part 13B (at least a surface of the sintered part (sintered layer) 16A) in a state of heating the sintered part (sintered layer) 16A and a non-sintered part 13B, an integrated body can be efficiently formed in which defects such as interfacial separation are controlled when sintering by the following first process and the second process to be repeated. The slurry is preferably mainly composed of water or an alcohol, and is a dispersion containing a ceramic particle for sintering in an amount preferably from 5% to 80% by volume, and more preferably 10% to 60% by volume dispersed in a dispersion medium containing a surfactant as required. A heating temperature of the sintered part (sintered layer) 16A and the non-sintered part 13B sprayed with the slurry is is not particularly limited, but is normally in a range from 120° C. to 400° C.

A thickness of the non-sintered part (non-sintered layer) 12B is preferably in a range from 1 μm to 1,000 μm, and more preferably from 100 μm to 500 μm.

Thereafter, the first process is conducted again, in the same manner as above, to form a carbon powder-containing layer 14B on a surface of the non-sintered part (non-sintered layer) 12B to obtain a lamination 10B (see FIG. 3 (5)). Then, the lamination 10B is subjected to the second process again to irradiate a region R2 shown in FIG. 3 (5) with laser, as in the above procedure, to sinter a ceramic for sintering from a surface of the non-sintered part (non-sintered layer) 12B to the sintered part (sintered layer) 16A in depth direction and form a sintered part (sintered layer) 16B containing a sintered part (sintered layer) 16A as an integrated body (see FIG. 3 (6)). FIG. 3 (6) shows that a sintered part (sintered layer) 16B is buried in a non-sintered part 13B formed so as to include a non-sintered part 13A in FIGS. 3 (4) and (5) except for its upper exposed part. When the non-sintered parts (non-sintered layer) 12A and 12B consist of a ceramic particle for sintering, the non-sintered part 13B can readily be removed with high-pressure spray, ultrasonic cleaning, sand blast, or the like, and accordingly, a shaped article 40A formed on one surface side of a base 11 shown in FIG. 3 (7) can be obtained.

In the explanation for production method of the shaped article using FIG. 3, a carbon powder-containing layer 14A and the like obtained by the first process and a non-sintered part (non-sintered layer) 12B and the like obtained by the third process are described to be entirely laminated on the base with the same area of the base 11. The present invention is not limited thereto. In a case where a sintered part (sintered layer) 16B is formed on a surface of the sintered part (sintered layer) 16A as part of a sintered part (sintered layer) contained on the surface of the sintered part (sintered layer) 16A, a non-sintered part (non-sintered layer) 12B in FIG. 3 (4) may be formed only on the surface of a sintered part (sintered layer) 16A, and a carbon powder-containing layer 14B in FIG. 3 (5) may be formed only in a part corresponding to a region R1 on the surface of the non-sintered part (non-sintered layer) 12B, for example.

Figure 4:
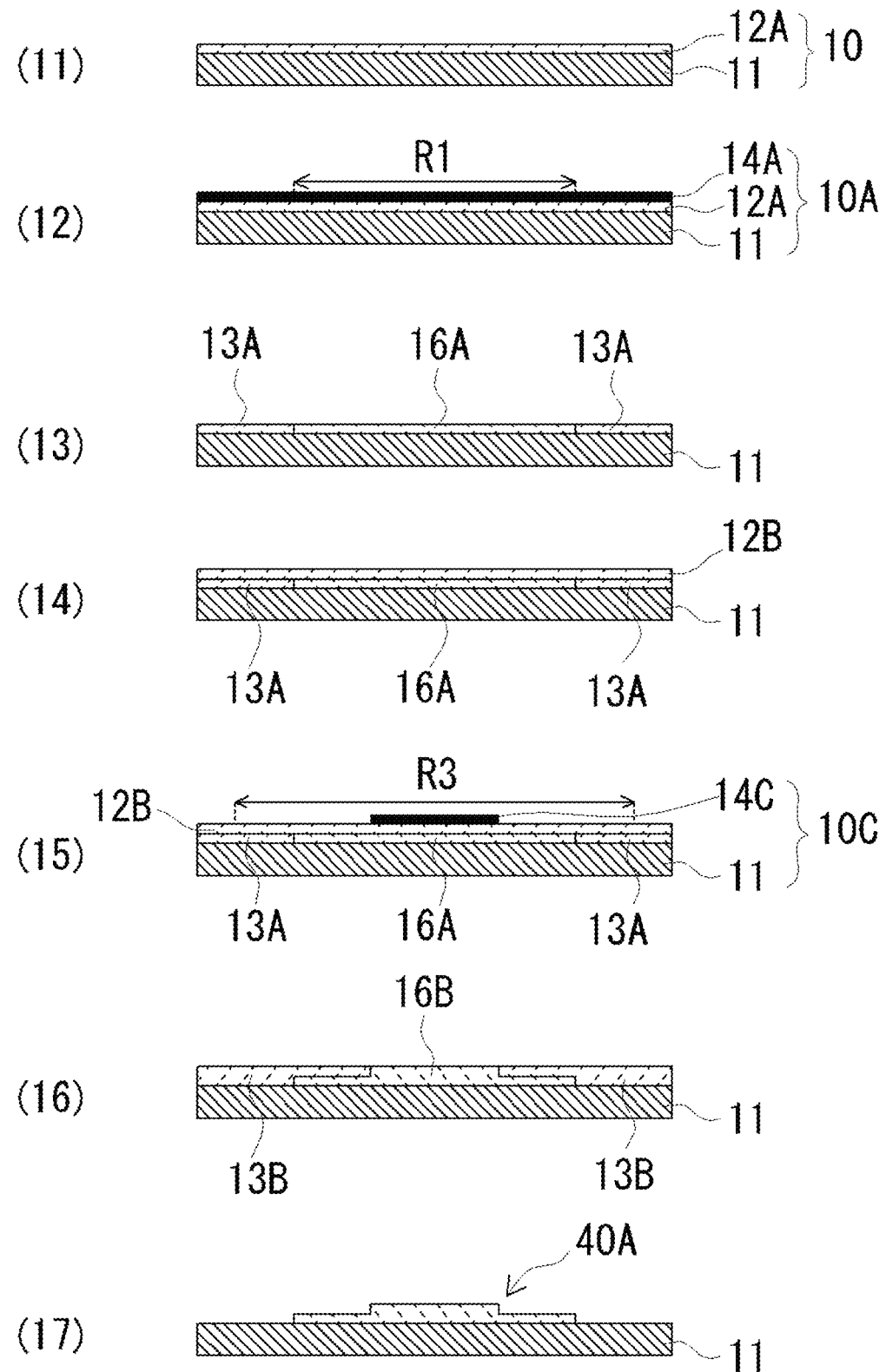
FIG. 4 is a schematic cross-sectional view showing another example of a production method of a shaped article in the present invention.

FIG. 4 is a schematic illustration explaining a method for producing a three-dimensional shaped article 40A shown in FIG. 4 (17). FIGS. 4 (11) to (14) can represent the same meanings as FIGS. 3 (1) to (4), respectively.

FIG. 4 (15) shows the first process performed again, showing that a carbon powder-containing layer 14C is formed on a part of the surface of a non-sintered part (non-sintered layer) 12B (a part corresponding to an upper surface of a reference component 16B in FIG. 4 (16)) to obtain a lamination 10C. Then, the lamination 10C is subjected to the second process again, and a region R3 shown in FIG. 4 (15) is irradiated with laser in the same manner as above to sinter a ceramic for sintering from a surface of the non-sintered part (non-sintered layer) 12B to a sintered part (sintered layer) 16A in depth direction on the lower part side of the carbon powder-containing layer 14C to form a sintered part (sintered layer) 16B containing the sintered part (sintered layer) 16A as an integrated body (see FIG. 4 (16)). The method is designed to allow the laser irradiation surface to contain a part other than the carbon powder-containing layer 14C. However, since the sintering temperature can readily be achieved in the carbon powder-containing layer 14C, the sintered part (sintered layer) 16B in FIG. 4 (16) can efficiently be formed. FIG. 4 (16) illustrates that a sintered part (sintered layer) 16B, except for its upper exposed part, is buried in a non-sintered part 13B formed so as to include a non-sintered part 13A in FIGS. 4 (14) and (15). When the non-sintered parts (non-sintered layer) 12A and 12B consist of a ceramic particle for sintering, as in FIG. 3, the non-sintered part 13B can readily be removed with high-pressure spray, ultrasonic cleaning, sand blast, or the like, and accordingly, a shaped article 40A formed on one surface side of a base 11 shown in FIG. 4 (17) can be obtained.

Figure 5:
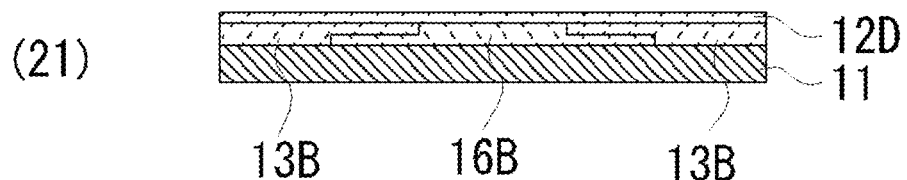
FIG. 5 is a schematic cross-sectional view showing another example of a production method of a shaped article in the present invention.
Figure 5:
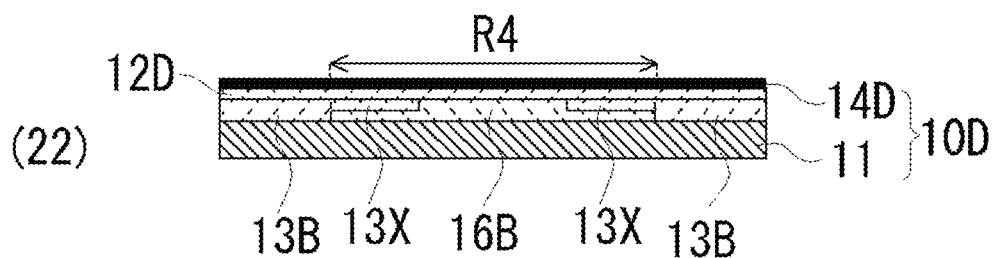
Figure 5:
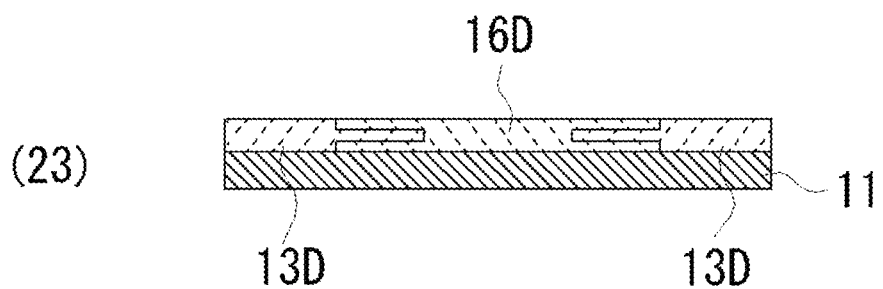
Figure 5:
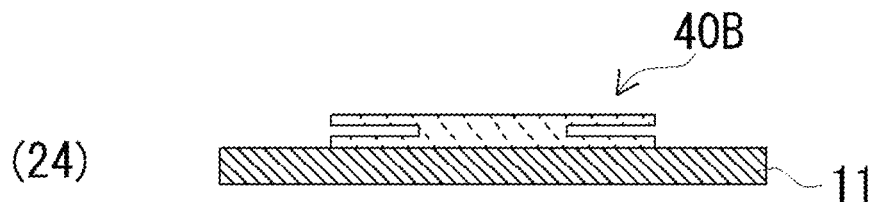

FIG. 5 is a schematic illustration explaining a method for producing a three-dimensional shaped article 40B shown in FIG. 5 (24), using a laminated material including a sintered part (sintered layer) 16B shown in FIG. 3 (6) or a laminated material including a sintered part (sintered layer) 16B shown in FIG. 4 (16).

FIG. 5 (21) is a cross-sectional view showing that a laminated material including the sintered material 16B shown in FIG. 3 (6) or a laminated material including the sintered part (sintered layer) 16B shown in FIG. 4 (16) is subjected to the third process to form a non-sintered part (non-sintered layer) 12D on the surface of a sintered part (sintered layer) 16B and a non-sintered part 13B. The non-sintered part (non-sintered layer) 12D can be formed in the same manner as for the non-sintered parts (non-sintered layer) 12A and 12B. A thickness of the non-sintered part (non-sintered layer) 12D may be the same as above.

Thereafter, a lamination 10 is obtained by the first process in which a carbon powder-containing layer 14D is formed on a surface of the non-sintered part (non-sintered layer) 12D. Then, the lamination 10D is subjected to the second process, and a region R3 shown in FIG. 5 (22) is irradiated with laser so as not to sinter a region 13X in the non-sintered part 13B to sinter a ceramic for sintering from a surface of the non-sintered part (non-sintered layer) 12D to the protrusion's upper surface of a sintered part (sintered layer) 16B in depth direction to form a sintered part (sintered layer) 16D (see FIG. 5 (23)). FIG. 5 (23) illustrates that a sintered part (sintered layer) 16D, except for its upper exposed part, is buried in a non-sintered part 13D formed so as to include a non-sintered part (non-sintered layer) 13B in FIGS. 5 (21) and (22). When the non-sintered parts (non-sintered layer) 12A, 12B, and 12D consist of a ceramic particle for sintering, a non-sintered part 13D can readily be removed in the same manner as above, and accordingly, a shaped article 40B formed on one surface side of the base 11 shown in FIG. 5 (24) can be obtained.

The production method of a ceramic compact of the first embodiment in the present invention is characterized by including a process for spraying a surface of a heated substrate with a slurry containing a ceramic particle and a dispersion medium, and having a ceramic particle concentration from 5% to 80% by volume (hereinafter, referred to as "spraying process").

The slurry used in the spraying process is a ceramic particle dispersion containing a ceramic particle and a dispersion medium.

The ceramic particle is preferably a particle consisting of an inorganic compound such as an oxide, a nitride, an oxynitride, a carbide and a carbonitride. The ceramic particle contained in the slurry may be one type or two or more types.

Examples of the oxide to be used include aluminum oxide, mullite, magnesium oxide, zinc oxide, titanium oxide, iron oxide, yttrium oxide, zirconium oxide, barium titanate, and the like.

Examples of the nitride to be used include silicon nitride, aluminum nitride, titanium nitride, zirconium nitride, tantalum nitride, iron nitride, and the like.

Examples of the oxynitride to be used include sialon, silicon oxynitride, and the like.

Examples of the carbonitride to be used include titanium carbonitride, niobium carbonitride, zirconium carbonitride, and the like.

A shape of the ceramic particle is not particularly limited and may be spherical, ellipsoid, polyhedral, linear, plate-like, or indefinite as a solid body. An average diameter of the ceramic particle is preferably in a range from 10 nm to 100 μm, and more preferably from 100 nm to 10 μm. When ceramic particles having two or more different shapes, or ceramic particles having different particle diameters are used, high-density ceramic compacts can be efficiently produced.

A concentration of a ceramic particle contained in the slurry is in a range from 5% to 80% by volume, preferably from 10% to 60% by volume, and more preferably from 20% to 40% by volume from a viewpoint of production efficiency of high-density ceramic compacts.

A main component of the dispersion medium may be water or an organic solvent, or a combination thereof. Examples of the organic solvent include an alcohol such as methanol, ethanol, propanol, and isopropyl alcohol; glycol, glycerin, acetonitrile, dioxane, lactate, N-methyl pyrrolidone, N,N-dimethylformamide, N,N-dimethylacetoamide, and the like. Among these, an alcohol is preferred.

In the present invention, water, or a combination of water and an alcohol is particularly preferable. When water and an alcohol are used in combination, a ratio of amounts to be used is not particularly limited. The alcohol is preferably used in an amount particularly from 20 to 80 parts by mass relative to 100 parts by mass of water.

The dispersion medium may consist of water and a dispersant, or water, an alcohol and a dispersant.

The dispersant may be a conventionally known surfactant such as an anionic surfactant, a cationic surfactant and a nonionic surfactant.

Examples of the anionic surfactant include a water-soluble salt such as a sulfonate, a sulfate ester salt, a carboxylate, a phosphate salt and a phosphonate. The soluble salt may be an alkali metal salt, an alkaline earth metal salt, an ammonium salt, an amine salt, or the like.

Examples of the cationic surfactant include an amine salt containing primary, secondary, and tertiary amines capable of forming a salt; a denatured salt thereof; an onium compound such as a quaternary ammonium salt, a phosphonium salt and a sulfonium salt; a cyclic nitrogen compound or heterocyclic compound such as a pyridinium salt, a quinolinium salt, and an imidazolinium salt, and the like.

Examples of the nonionic surfactant include an ether-type surfactant such as polyoxyethylene alkyl ether and polyoxyethylene alkyl phenyl ether; an ether ester-type surfactant such as polyoxyethylene glycerine fatty acid ester; an ester-type surfactant such as polyethylene glycol fatty acid ester; and an ethylene oxide condensation type surfactant such as fused ethylene oxide obtained by addition polymerization of ethylene oxide.

A content of the dispersant in a case where the dispersion medium contains the dispersant is not particularly limited, but is preferably in a range from 0.1 to 10 parts by volume, and more preferably from 0.1 to 0.5 part by volume relative to 100 parts by volume of the ceramic particle from a viewpoint of slurry stability and mist formability.

The ceramic compact obtained by the production method of the first embodiment in the present invention, as described later, can be used in various fields such as ingredients for producing a sintered compact, a particle-arrayed body, and a particle filled body. Accordingly, the slurry can contain other components so long as the slurry can form a mist. Examples of the other components include a viscous substance such as a polymer binder, a sintering aid, a surface modifier, and the like.

The polymer binder is not particularly limited so long as it is dissolved or dispersed in a medium consisting of at least one of water and an organic solvent. The polymer may be polyvinyl alcohol, polyvinyl acetal, acrylic polymer, polyvinyl acetate, polyvinyl butyral, or the like.

When the slurry contains a polymer binder, the upper limit of the concentration is preferably 5% by volume, more preferably 3% by volume, and further preferably 1% by volume from a viewpoint of mist forming property.

The temperature of the slurry used in the spraying process is not particularly limited, but is normally in a range from 10° C. to 80° C.

In the spraying process, slurry's mist is fed into the surface of a substrate normally heated at a temperature of 150° C. or higher and under 400° C., and preferably heated at a temperature ranging from 200° C. to 300° C. The substrate is not particularly limited so long as it is not degraded or deformed at the above temperature. The material constituting the substrate is normally an inorganic material, and may be a metal (including an alloy) or a ceramic, or a composite of these materials. The substrate may consist of a material which will be integrated with a ceramic compact by the spraying process.

A shape of a surface (surface for mist deposition) of the substrate may be flat, or include a concave part or a protrusion.

The substrate can be heated with a resistance heater, an infrared lamp heater, a microwave heater, or a high-frequency induction heater. The sprayed surface of the slurry of the substrate may be heated, or heating may be conducted at a back side of the substrate.

A rate of feeding a slurry onto the substrate, namely a rate of feeding a mist is not particularly limited. In the present invention, the rate is preferably in a range from 0.1 to 200 mL/min, and more preferably from 0.5 to 100 mL/min in that the mist is attached to the substrate, the dispersion medium is volatile, and a higher-density ceramic particle is smoothly achieved. A shape and size of the mist depend on a size of a ceramic particle, a concentration of the ceramic particle contained in a slurry, and the like, but they are not particularly limited.

The slurry spraying method is selected according to a shape of the substrate, a rate of feeding a slurry, and the like, but it is not particularly limited. The method may be to spray a slurry linearly or at wide-angle, continuously or intermittently toward a specific position of the substrate using a conventionally known spray nozzle. The mist can be subjected to free fall, can enter air stream over a substrate using high-pressure gas, or can be charged.

A target ceramic compact may consist of only one type of ceramic particle, or two or more types of ceramic particles. When a target ceramic compact consisting of two or more types of ceramic particles is produced, a method for individually spraying with a plurality of slurries each containing only one type of ceramic particle, or a method for spraying with a slurry containing all types of ceramic particles may be employed.

An atmosphere between a spray nozzle and a substrate may be a gas selected from air, oxygen gas, ozone gas, nitrogen gas, ammonia gas, NO gas, $NO_2$ gas, $N_2O$ gas, CN gas, methane-ammonia mixture gas, CO-ammonia mixture gas, $CO_2$-ammonia mixture gas, methane gas, CO gas, $CO_2$ gas, HS gas, SO gas, $SO_2$ gas, $SO_3$ gas, argon gas, and herium gas, or vacuum.

The spraying process can be conducted according to a shape, size, or the like of a target ceramic compact while moving a spray nozzle and/or a substrate. When the substrate is column-like and a ceramic compact is formed entirely on the surface, for example, a method for spraying with a slurry toward a predetermined position while rotating the substrate may be employed.

According to the production method of a ceramic compact of the first embodiment in the present invention, a ceramic compact whose filling density of the ceramic particle by bulk density method is high at 85% or more can be efficiently produced.

The production apparatus for the production method of a ceramic compact of the first embodiment in the present invention (hereinafter, referred to as "first production apparatus of the present invention") includes a slurry spraying part 52 for spraying a substrate 60 with a slurry containing a ceramic particle and a dispersion medium, and a substrate heating part 54 for heating the substrate 60.

The first production apparatus of the present invention may be a closed-system apparatus or an open-system apparatus.

The first production apparatus of the present invention may further include a temperature measuring part for measuring the temperature of a substrate 60, an atmosphere adjusting part, an exhausting part, an applied slurry thickness measuring part (all not shown), and the like.

Figure 15:
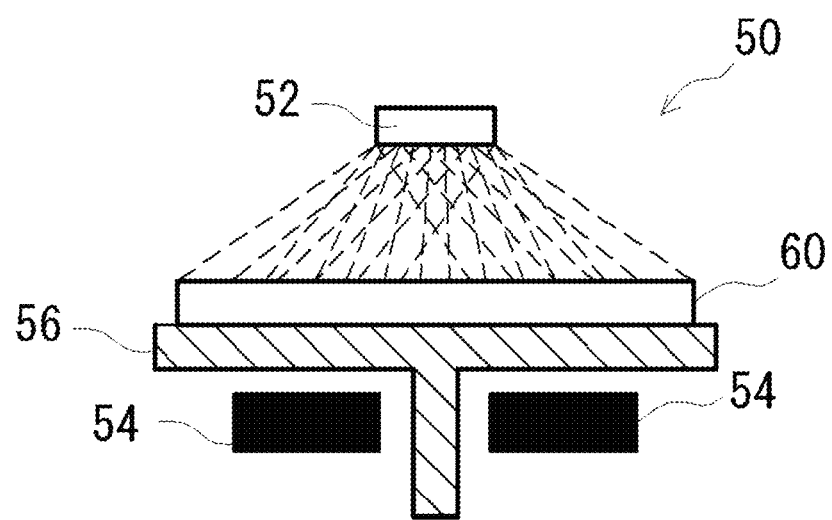
FIG. 15 is a schematic illustration showing one example of a production method of a ceramic compact of the first embodiment in the present invention.
Figure 16:
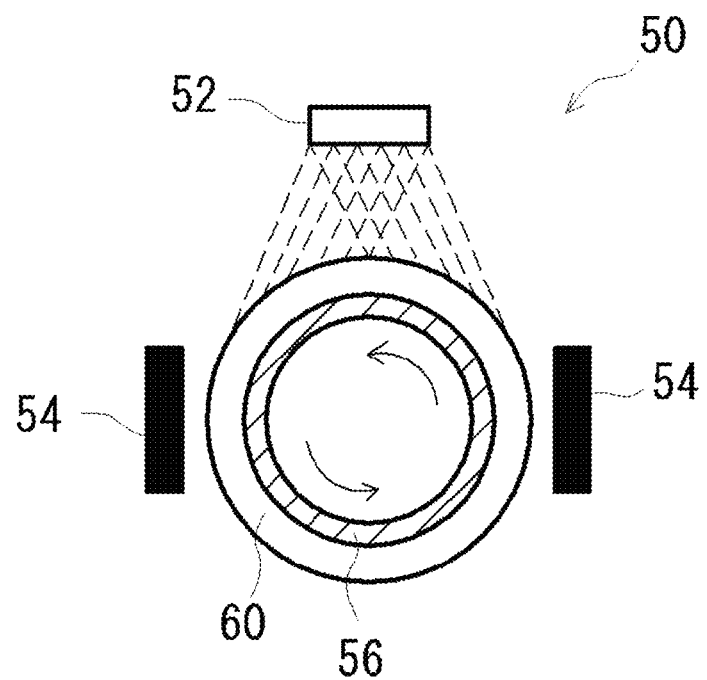
FIG. 16 is a schematic illustration showing another example of a production method of a ceramic compact of the first embodiment in the present invention.

The first production apparatus of the present invention is illustrated in FIG. 15 and FIG. 16, but the present invention is not limited thereto.

FIG. 15 illustrates an apparatus 50 for producing a ceramic compact by heating a plate-like substrate 60 placed on a substrate placing stage 56 consisting of a material having favorable thermal conductivity or having ventilation in upper and lower directions by driving a substrate heating part 54 disposed in a lower part thereof, and then spraying the substrate 60 with a slurry from a slurry spraying part 52 that is disposed in an upper part of the substrate 60.

FIG. 16 illustrates an apparatus 50 for producing a ceramic compact by heating a cyclic substrate 60 externally fitted to a rotatably cylindrical substrate placing stage 56 by driving a substrate heating part 54 disposed on both sides thereof, and then spraying the substrate 60 with a slurry from a slurry spraying part 52 disposed in an upper part of the substrate placing stage 56.

The slurry spraying part 52 may be secured or movable, and the substrate 60 may be sprayed with the slurry toward a specific position linearly or at wide-angle, continuously or intermittently. When the slurry is sprayed, the mist can be subjected to free fall, can enter air stream over a substrate using high-pressure gas, or can be charged. In a case of using a charged mist, electrostatic spraying means may be used.

The substrate heating part 54 directly heats the substrate according to its shape, or indirectly heats the substrate via an interposition such as a partition wall, and a resistance heater, an infrared lamp heater, a microwave heater, a high-frequency induction heater, or a laser beam heater may be used. In FIG. 15, the substrate 60 is placed on a substrate placing stage 56, but the present invention is not limited thereto. The substrate 60 may be placed, as required, on the substrate heating part 54.

In FIGS. 15 and 16, only one slurry spraying part 52 is provided, but the present invention is not limited thereto. A plurality of slurry spraying parts 52 for individually spraying a plurality of slurries containing only one type of ceramic particle may be provided. Further, the first production apparatus may include a plurality of slurry spraying parts 52 and substrate heating parts 54 to form a multilayered ceramic compact consisting of different types of ceramic particles by moving the substrate using a conveyor or the like.

The production method of a ceramic compact of the second embodiment in the present invention is characterized by including a coating process in which a slurry comprising a ceramic particle and a polymer binder is coated to a surface of a substrate, and a degreasing process in which a film-coated substrate obtained in the coating process is heated from a lower side of the film-coated substrate to degrease the coat, characterized in that the lower surface of the film-coated substrate is non-uniformly heated in the degreasing process. The production method may repeat the coating process and the degreasing process.

The slurry used in the coating process contains a ceramic particle and a polymer binder, and normally a medium consisting of water or an organic solvent.

The ceramic particle is preferably a particle consisting of an inorganic compound such as an oxide, a nitride, an oxynitride, a carbide and a carbonitride. The ceramic particle contained in the slurry may be one type or two or more types.

Examples of the oxide to be used include aluminum oxide, mullite, magnesium oxide, zinc oxide, titanium oxide, iron oxide, yttrium oxide, zirconium oxide, barium titanate, and the like.

Examples of the nitride to be used include silicon nitride, aluminum nitride, titanium nitride, zirconium nitride, tantalum nitride, iron nitride, and the like.

Examples of the oxynitride to be used include sialon, silicon oxynitride, and the like.

Examples of the carbonitride to be used include titanium carbonitride, niobium carbonitride, zirconium carbonitride, and the like.

A shape of the ceramic particle is not particularly limited and may be spherical, ellipsoid, polyhedral, linear, plate-like, or indefinite as a solid body. An average diameter of the ceramic particle is preferably in a range from 10 nm to 100 μm, and more preferably from 100 nm to 10 μm. When ceramic particles having two or more different shapes, or ceramic particles having different particle diameters are used, high-density ceramic compacts can be efficiently produced.

A concentration of a ceramic particle contained in the slurry is in a range from 30% to 80% by volume, preferably from 40% to 70% by volume, and more preferably from 50% to 60% by volume from a viewpoint of production efficiency of high-density ceramic compacts.

The polymer binder is not particularly limited so long as it is dissolved or dispersed in a medium consisting of at least one of water and an organic solvent. In the present invention, a medium mainly consisting of water is preferably used, and in this case, polyvinyl alcohol, polyvinyl acetal, acrylic polymer, polyvinyl acetate, and polyvinyl butyral are preferable.

A concentration of the polymer binder contained in the slurry is preferably in a range from 0.1% to 20% by volume, more preferably from 1% to 10% by volume, and further preferably from 2% to 5% by volume from a viewpoint of production efficiency of high-density ceramic compacts.

The ceramic compact obtained by the production method of the second embodiment in the present invention, as described later, can be used in various fields such as ingredients for producing a sintered compact, a particle-arrayed body, and a particle filled body. Accordingly, the slurry can contain other components including a viscous substance such as a polymer binder, a sintering aid, a surface modifier, and the like.

The coating process applies a slurry to a surface of the substrate. The substrate is not particularly limited so long as it is not degraded or deformed in the degreasing process. The material constituting the substrate is normally an inorganic material, and may be either a metal (including an alloy) or a ceramic, or a composite of these materials. The material may be one leading to integration of the substrate and a ceramic compact in the degreasing process.

A shape of the substrate is not particularly limited. A substrate is generally used in which a surface for slurry application is flat, but a substrate may be used in which the surface is provided with a concave part or a protrusion.

In the coating process, a method for applying a slurry to a surface of the substrate is not particularly limited. It is normally selected according to a shape of the surface of the substrate, components of the slurry to be used, and the like. Examples of the preferable applying method include screen printing, doctor blade method, spin-coating method, curtain coater method, dip coating method, and the like.

An upper limit of a thickness of the coating film obtained in the coating process is preferably 10 mm, and more preferably 500 μm from a viewpoint of efficient production of a ceramic compact.

The film-coated substrate obtained in the coating process may immediately be subjected to a degreasing process, or may be allowed to stand for an upper limit of 10 hours in order to reduce deformation of the coating film, defoam the coating film, solidify a polymer binder, and the like.

Figure 18:
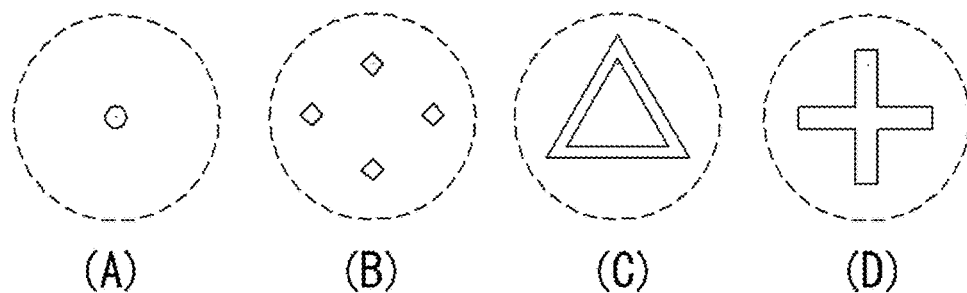
FIG. 18 is a schematic illustration viewed from above a protrusion formed in a heat source (heat-treating part) where a film-coated substrate is placed in a production method of a ceramic compact of the second embodiment in the present invention.
Figure 19:
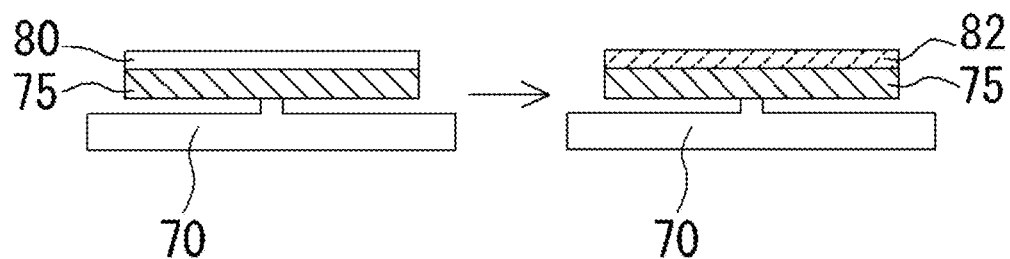
FIG. 19 is a schematic cross-sectional view showing one example of a method in which a film-coated substrate is heated and degreased in the production method of a ceramic compact of the second embodiment in the present invention.

In the degreasing process, the film-coated substrate is heated from a lower part thereof, and a lower surface of the film-coated substrate is subjected to non-uniformly heating. "Non-uniformly heating" refers to heating a film-coated substrate preferably disposed in a horizontal direction so as to have partial temperature difference by forming a part heated at a desired temperature and a part heated at a lower temperature on a lower surface of the film-coated substrate upon heating. Deformation of the resulting ceramic compact obtained is suppressed and cracks are also reduced. In the present invention, a method for non-uniformly heating a lower surface of a film-coated substrate provided with a coating film 80 formed on the surface of a substrate 75 is not particularly limited. For example, as shown in FIG. 19, a method for heating a film-coated substrate placed on a protrusion of a heat source 70 in which the shape of the protrusion (planar shape of part in contact with lower surface of film-coated substrate) with a heat source is in a form of a point or a line shown in FIG. 18 (hereinafter referred to as "method (1)") may be employed. Or, as shown in FIG. 20, a method for heating a film-coated substrate placed on an insulation 78 so that a part of the lower surface is exposed on a heat source 71 (hereinafter referred to as "method (2)") may be employed.

Figure 25:
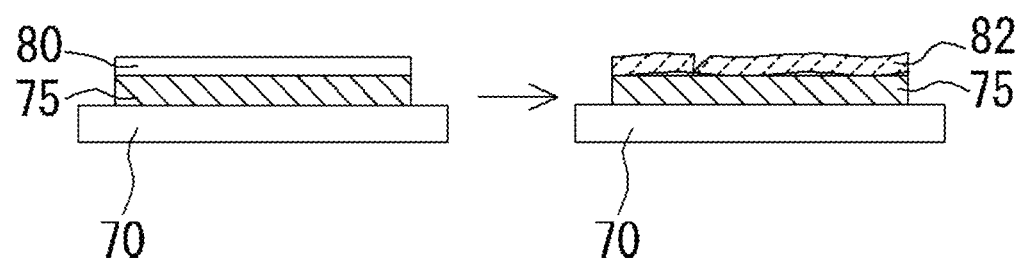
FIG. 25 is a schematic cross-sectional view showing one example of a method in which a film-coated substrate is uniformly heated and degreased.

The method (1) is shown in FIG. 19 and illustrates a method in which a film-coated substrate is placed on a protrusion of the heat source 70 heated at a predetermined temperature. For example, a substrate and a coating film just above a protrusion having a pattern part of a point or a line shown in FIG. 18 are heated at a predetermined temperature instantly and a polymer binder is gasified, the resulting gas is fed in a direction away from a degreasing part just above the protrusion in the coating film, the heat is transferred, and degreasing is gradually proceeded. Since a coating film at a part in which the substrate 75 is not contact with the protrusion is heated at a lower temperature than a predetermined temperature at an early stage, degreasing is insufficient. The temperature reaches the predetermined temperature as time elapses to obtain a sufficiently degreased ceramic compact 82. When the substrate 75 and the coating film 80 are entirely uniformly heated, a ceramic compact 82 having significant deformation and cracks is obtained as shown in FIG. 25. The present invention can reduce such defects.

When the method (1) is employed to heat a film-coated substrate, a heater having a protrusion is preferably used as the heat source 70. A resistance heater, an infrared lamp heater, a microwave heater, a high-frequency induction heater, and the like may be used.

Figure 20:
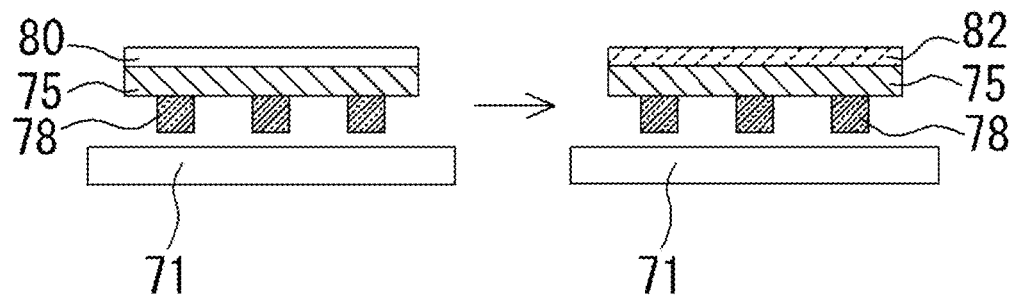
FIG. 20 is a schematic cross-sectional view showing another example of a method in which a film-coated substrate is heated and degreased in the production method of a ceramic compact of the second embodiment in the present invention.

The method (2) is shown in FIG. 20 and illustrates a method in which a film-coated substrate is placed on the insulation 78 that is disposed in an upper part of the heat source 71 so as to allow a part of a lower surface of a substrate 75 to be exposed. The coating film above the substrate 75 whose lower surface side is exposed is heated at a predetermined temperature instantly, a polymer binder is gasified, the resulting gas is fed just above the insulation 78 in the coating film, the heat is transferred, and degreasing is gradually proceeded. Since a coating film at a part in which the substrate 75 is contact with the insulation 78 is heated at a lower temperature than a predetermined temperature at an early stage, degreasing is insufficient. The temperature reaches the predetermined temperature as time elapses to obtain a sufficiently degreased ceramic compact 82. The insulation 78 may be a solid body or a porous body consisting of a ceramic.

When the method (2) is employed to heat a film-coated substrate, a resistance heater, an infrared lamp heater, a microwave heater, a high-frequency induction heater, and the like may be used as the heat source 71. Each of these heaters may include a protrusion on a side of the substrate 75.

The heating temperature in the degreasing process is selected according to types of the ceramic particle and the polymer binder, but is preferably 200° C. or higher, and more preferably 300° C. or higher. An upper limit of the heating temperature is normally 500° C. in that a high-density ceramic compact can efficiently be obtained. The film-coated substrate may be heated at a constant temperature throughout the process, or be heated using a method including temperature increase.

A time for heating the film-coated substrate is selected according to a thickness, area or the like of a coating film, but is preferably in a range from one to 30 minutes, more preferably from 3 to 15 minutes, and further preferably from 5 to 10 minutes.

Heating of the film-coated substrate is against the lower surface thereof, in other words, the substrate itself. In the present invention, heating the substrate and heating the coating film surface may be conducted. In this case, an upper limit temperature for heating the coating film surface (atmospheric temperature) is normally 300° C., and preferably in a range from 150° C. to 200° C. If the heating temperature of the coating film surface is too high, the coating film is prone to cracks or deformation.

The heating atmosphere in the degreasing process is selected according to types of ceramic particle or the like. The atmosphere may be ambient air, oxygen gas, nitrogen gas, argon gas, and the like.

In the degreasing process, a film-coated substrate may be heated, with a heat-resistant member placed on a part or all of a surface of the coating film.

The degreasing process leads to a degreased film (ceramic compact) whose thickness is reduced to normally 30% to 70% of the coating film by the coating process. The degreased film and the substrate can be integrated depending on types of ceramic particle contained in a slurry and a component material of the substrate.

In the present invention, the coating process and the degreasing process can be repeated as described above. Specifically, all or part of the surface of a degreased film obtained in the first production is subjected to repeating of these processes to form thicker layers and partial lamination for a three-dimensional layer. When the coating process and the degreasing process are repeated, the configuration of the slurry used in the coating process (types or concentration of ceramic particle) may be changed.

According to the present invention, a ceramic compact with a ratio of the total volume of a ceramic particle to a certain volume or a filling density of preferably 74% or higher, more preferably 85% or higher, and further preferably 90% or higher can be obtained. The filling density can be measured by Archimedean method, bulk density method, or the like.

The production apparatus for the production method of a ceramic compact of the first embodiment in the present invention (hereinafter, referred to as "second production apparatus of the present invention") is characterized in that the production apparatus includes a heat-treating part which places a film-coated substrate formed by applying a slurry containing a ceramic particle and a polymer binder to a surface of a substrate and then heats the film-coated substrate from a lower side thereof, and that the heat-treating part has a protrusion in point contact with or in line contact with a substrate part of the film-coated substrate.

The heat-treating part heats the film-coated substrate in its substrate part, and a planar shape of the protrusion in point contact with or in line contact with the substrate part may be ones shown in e.g., FIG. 18. FIG. 18 illustrates a protrusion formed in a heat-treating part for placing a film-coated substrate viewed from above, each showing a planar shape capable of stably supporting a film-coated substrate without inclining and non-uniformly heating the same. FIG. 18 (A) illustrates a protrusion whose planar shape is circular, FIG. 18 (B) a protrusion whose planar shape is a rectangle (4 points), FIG. 18 (C) a protrusion consisting of outlines of a triangle, and FIG. 18 (D) a protrusion consisting of cross hair.

The heat-treating part preferably includes a resistance heater, an infrared lamp heater, a microwave heater, a high-frequency induction heater, or the like.

The second production apparatus of the present invention includes a specific heat-treating part as mentioned above, however, other components in the apparatus are not particularly limited so long as it includes a structure for heating a film-coated substrate from a lower part thereof. The second production apparatus of the present invention may be a closed-system apparatus or an open-system apparatus. The apparatus may be batch-type or continuous-type.

The closed-system apparatus for producing a ceramic compact may include means for adjusting the atmosphere in an apparatus, means for exhausting the apparatus of the gas generated by degreasing process, means for heating the surface of a coating film, means for preparing a film-coated substrate in the apparatus, means for carrying a plurality of film-coated substrates out for continuous treatment, means for carrying a film-coated substrate prepared outside in the apparatus and out of the apparatus after degreasing process, means for cooling the same, and the like.

The open-system apparatus for producing a ceramic compact may include means for exhausting the apparatus of the gas generated by degreasing process, means for heating the surface of a coating film, means for preparing a film-coated substrate in the apparatus, means for carrying a plurality of film-coated substrates out for continuous treatment, means for carrying a film-coated substrate prepared outside in the apparatus and out of the apparatus after degreasing process, means for cooling the same, and the like.

EXAMPLES

Hereinafter, embodiments of the present invention are specifically described using Examples. The present invention is not limited to the Examples.

1. Production of Sintered Material

The following test employed a plate-like ceramic for sintering (20 mm×20 mm×300 µm) that was obtained using an aluminum oxide particle, with a ratio of a total volume of aluminum oxide particles to a certain volume of 92%.

Comparative Example 1-1

Figure 6:
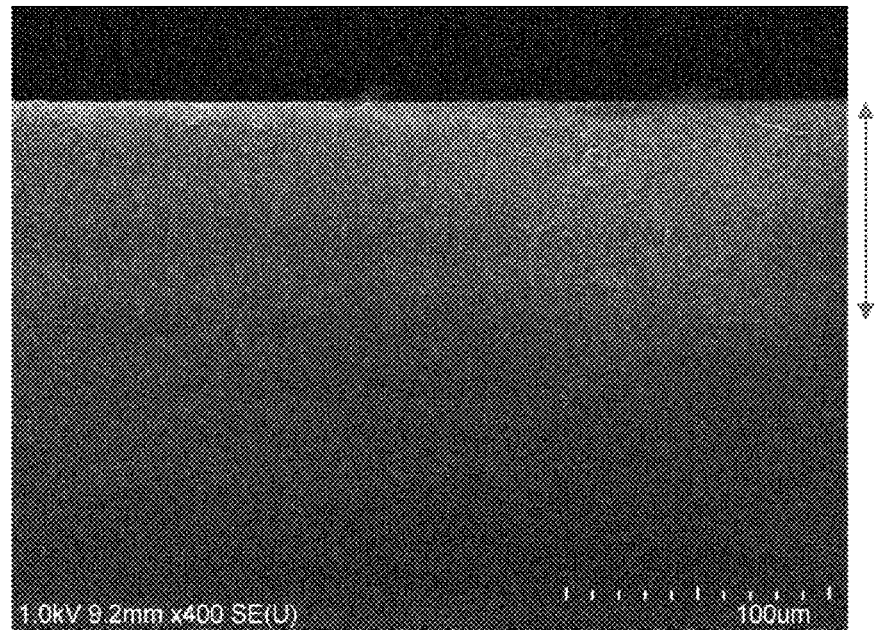
FIG. 6 is a SEM image showing a cross-sectional view of a surface layer part on the side of a laser irradiation part of a sintered material obtained in Comparative Example 1-1.

A light source of Nd:YAG laser was disposed just above a plate-like ceramic for sintering, and the plate-like ceramic for sintering was irradiated with laser having a wavelength of 1,064 nm and an output of 450 W from the light source so that the beam diameter was 5 mm at the plate-like ceramic for sintering. The laser radiation was conducted for one minute, and a surface layer part of a cross section for a sintered material obtained was observed with SEM. It was found that particle bonding was observed by approximately 100 µm in depth direction of a cross section of a sintered part (length of arrow part in FIG. 6). The ratio of a bonded particle was approximately 60% from the surface to about 5 µm in depth direction, approximately 30% from the surface to about 50 µm in depth direction, and approximately 5% from the surface to 100 µm in depth direction. Accordingly, the deeper particle bonding, the smaller the ratio, and fine sintered layer was not formed (see FIG. 6).

Example 1-1

The surface of the plate-like ceramic for sintering was sprayed with aerosol dry graphite film-forming lubricant "DGF spray" (product name) manufactured by Nihon Senpakukougu Corporation for about one second. Thereafter, the resultant was allowed to stand for 30 seconds to obtain a lamination having a carbon powder-containing layer having a thickness of approximately 5 µm.

Figure 7:
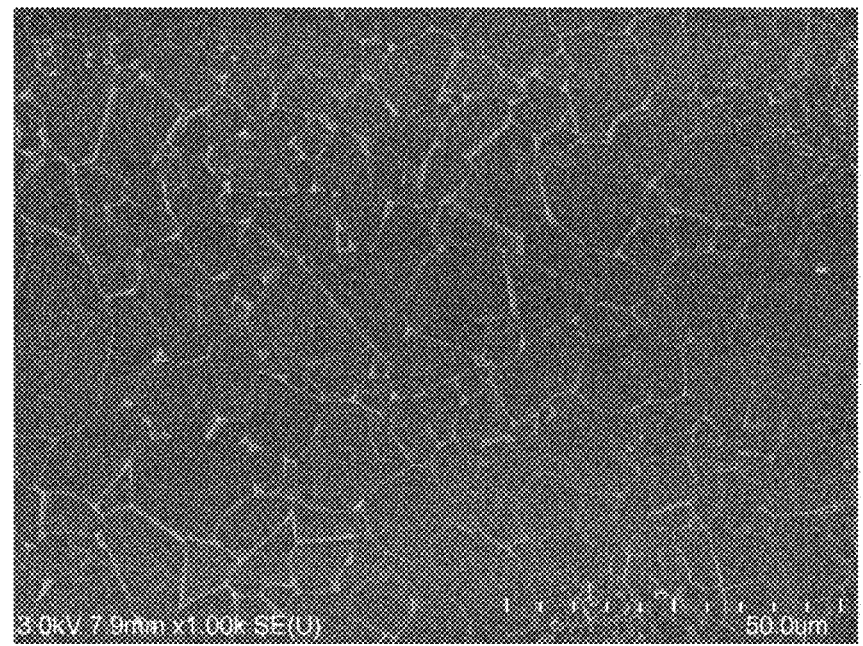
FIG. 7 is a SEM image showing the surface of a laser irradiation part of a sintered material obtained in Example 1-1.
Figure 8:
FIG. 8 is a magnified view of FIG. 7.

Subsequently, the lamination was placed on a stainless stage having a heater and heated until the surface temperature of the carbon powder-containing layer reached 500° C. The same position of the surface of the carbon powder-containing layer was irradiated with laser having a wavelength of 1,064 nm and an output of 50 W for 10 seconds. The beam diameter in the carbon powder-containing layer was set at 5 mm. SEM images of the surface of a sintered material obtained and an enlarged part thereof are shown in FIG. 7 and FIG. 8, respectively. These figures demonstrate sufficient sintering.

Figure 9:
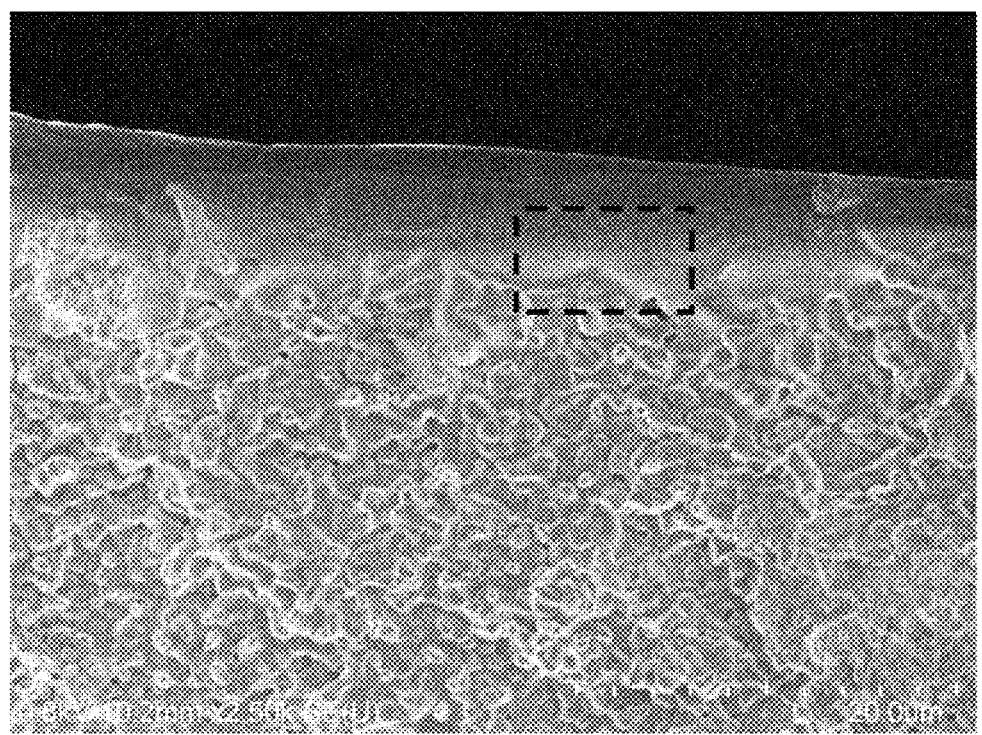
FIG. 9 is a SEM image showing a cross-sectional view of a surface layer part on the side of a laser irradiation part of a sintered material obtained in Example 1-1.
Figure 10:
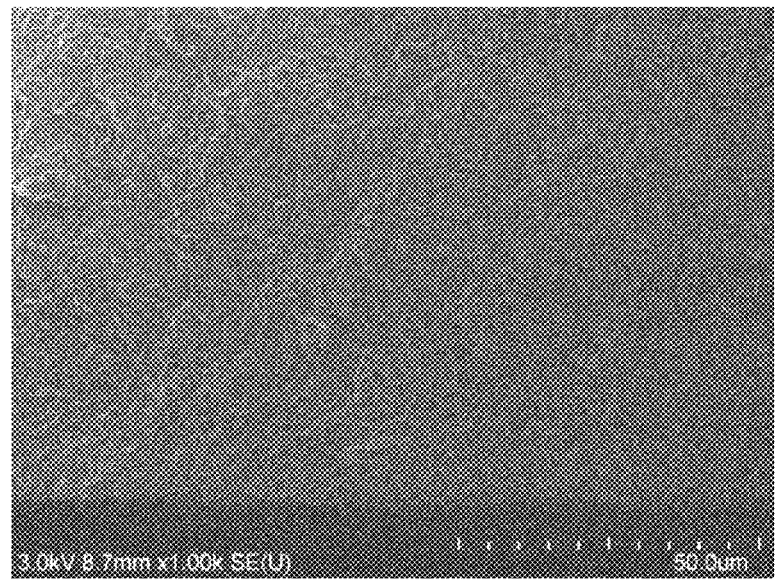
FIG. 10 is a SEM image showing a cross-sectional view of a surface layer part on the side of a laser non-irradiation part of a sintered material obtained in Example 1-1.
Figure 11:
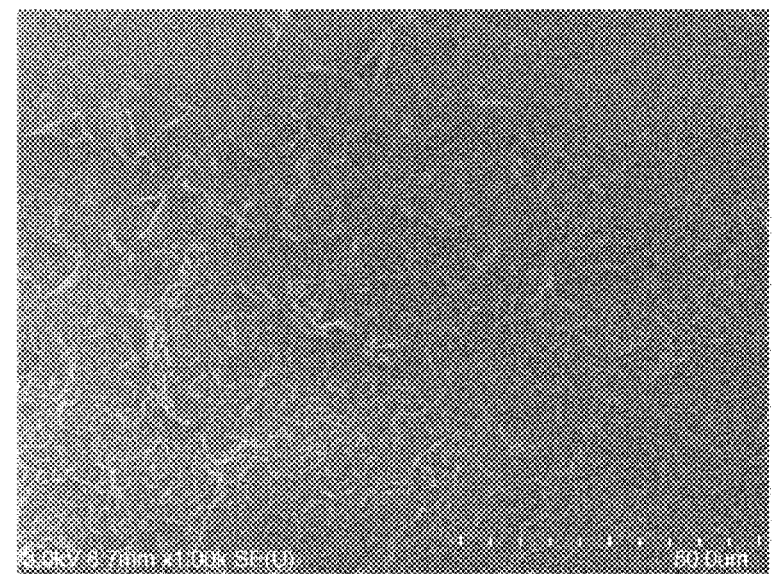
FIG. 11 is a magnified view of a part surrounded by dotted line of FIG. 9.

SEM images of the surface layer parts of both surface sides (laser irradiation surface side and non-irradiated surface side) in the sintered material obtained are shown in FIG. 9 and FIG. 10, respectively. FIG. 10 is an image showing the surface layer part of the non-irradiated surface side, and it was found that due to sintering, laser energy reached at least 300 µm in depth direction for 10 seconds. FIG. 11 is a magnified view of a part surrounded by dotted line of FIG. 9, showing sufficient sintering.

Example 1-2

The same procedure as in Example 1-1 was conducted except for an output of Nd:YAG laser of 150 W and a beam diameter in a carbon powder-containing layer of 10 mm. The laser density in the Example 1-2 is 75% of the one in Example 1-1.

Figure 12:
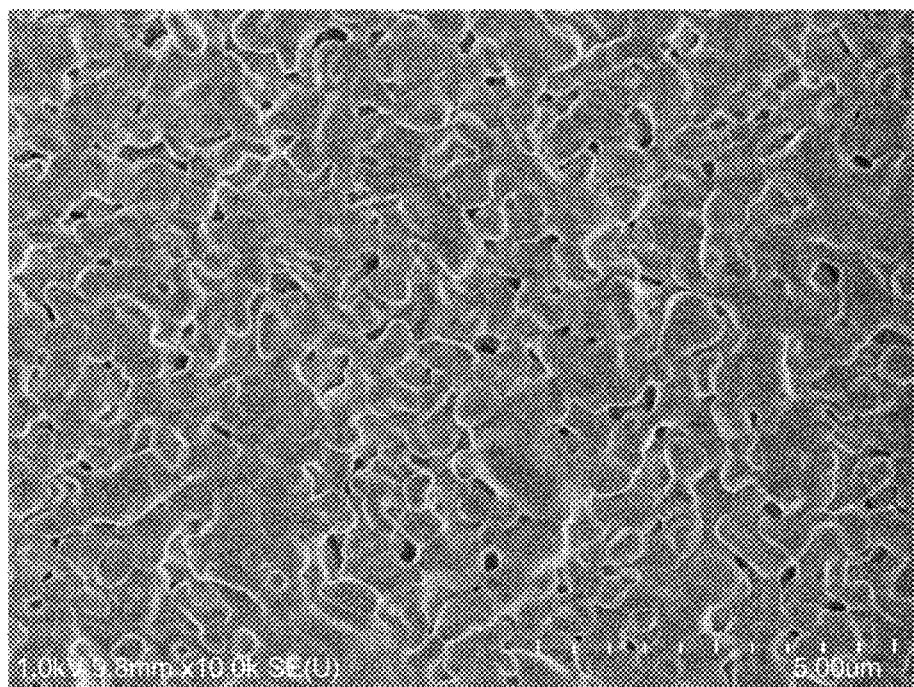
FIG. 12 is a SEM image showing a surface of a laser irradiation part of a sintered material obtained in Example 1-2.

FIG. 12 is a SEM image of the surface of a sintered material obtained showing sufficient sintering.

Figure 13:
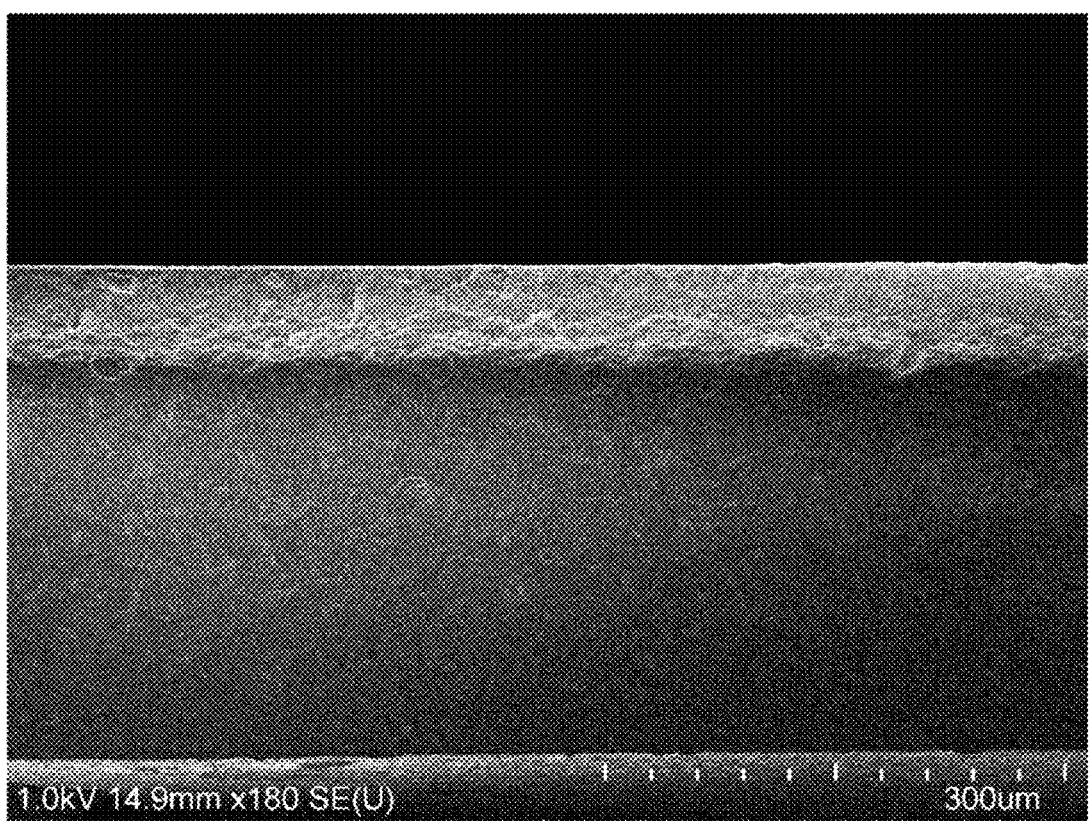
FIG. 13 is a SEM image showing a cross-sectional view of a surface layer part on the side of a laser irradiation part of a sintered material obtained in Example 1-2.

FIG. 13 is a SEM image showing a surface layer part of a sintered material obtained. FIG. 13 demonstrates sintering in a part approximately 50 µm in length (depth) direction in cross section.

Example 1-3

The aluminum oxide sintered plate obtained in Example 1-1 was placed on a stainless stage having a heater, and heated until the temperature of the surface on the upper surface side reached 350° C. Then, the surface on the upper surface side was sprayed with a water dispersion (slurry) containing 30% by volume of an aluminum oxide particle having an average particle diameter of 0.5 µm to form a non-sintered layer with a thickness of approximately 100 µm. Thereafter, the surface of the non-sintered layer was sprayed with the above "DGF spray" for about one second. The resultant was allowed to stand for 30 seconds to obtain a lamination having a carbon powder-containing layer with a thickness of approximately 5 µm.

Figure 14:
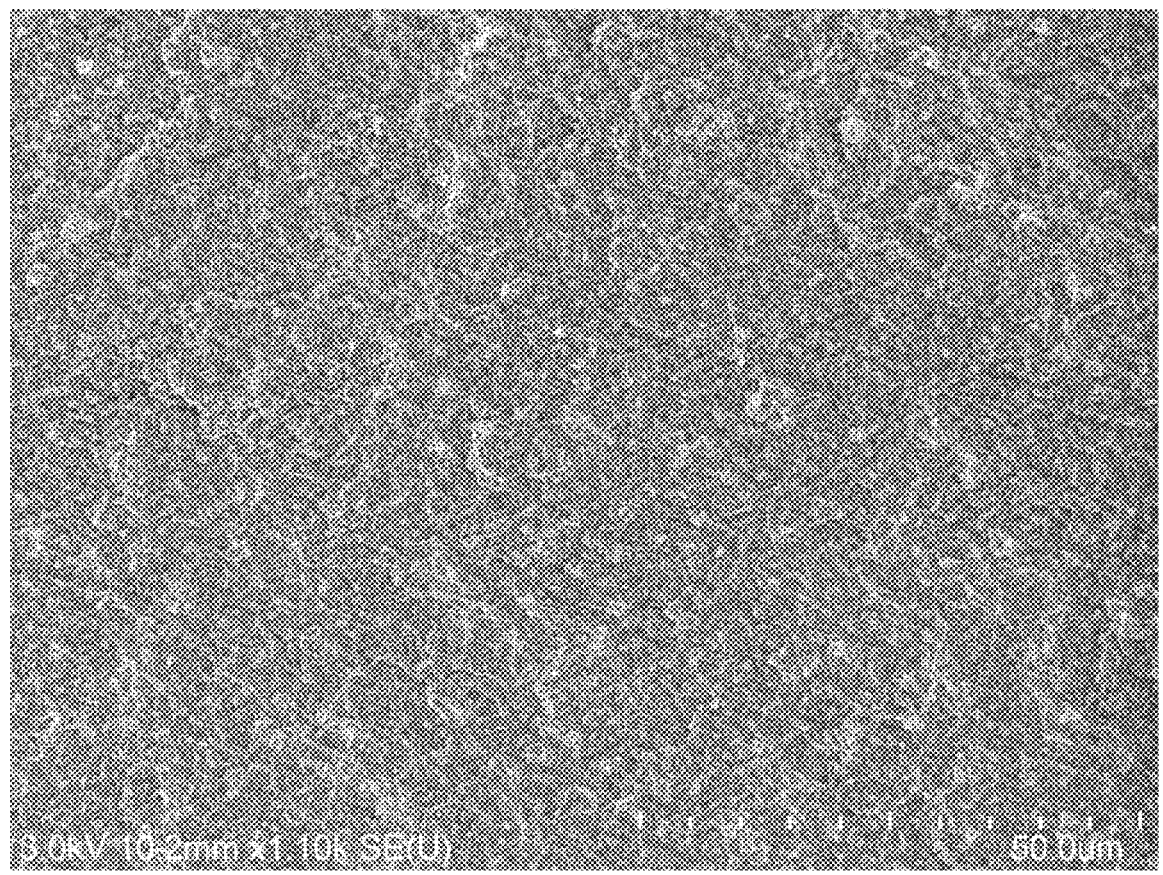
FIG. 14 is a SEM image showing a laminated interface of a laminated sintered material obtained in Example 1-3.

Subsequently, the same position of the surface of the carbon powder-containing layer was irradiated with laser having a wavelength of 1,064 nm and an output of 80 W for 10 seconds (beam diameter in carbon powder-containing layer: 5 mm) to sinter a non-sintered layer and obtain a laminated sintered material. FIG. 14 is a SEM image of a laminated interface of the laminated sintered material obtained. FIG. 14 demonstrates the more unidentified the interface is, the more sufficiently it is integrated.

2. Production Method of Ceramic Compact

Example 2-1

An aluminum oxide particle in non-uniformly shape and with an average particle diameter of 0.5 µm, and a aqueous solution of a surfactant were stirred and mixed to prepare a slurry. The contents of the aluminum oxide particle and the surfactant contained in the slurry were 30% by volume and 0.1% by volume, respectively.

Subsequently, as shown in FIG. 15, the entire surface of a plate-like substrate (20 mm×20 mm×2 mm) consisting of an aluminum oxide sintered compact with a surface temperature of 350° C. by infrared heating was sprayed with 1.4 mL of the slurry to obtain an aluminum oxide film having a thickness of approximately 100 µm. Deviations of film thickness were not found.

Figure 17:
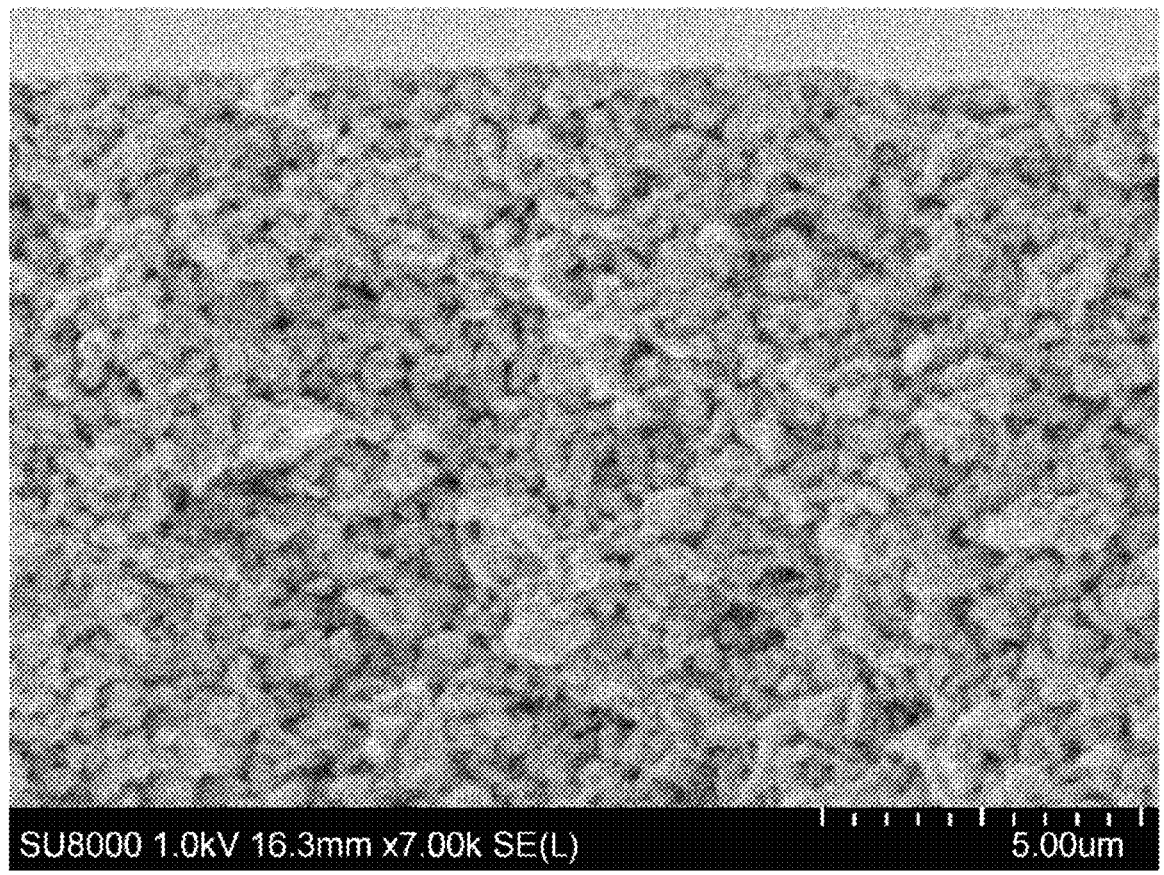
FIG. 17 is a cross-sectional image showing a surface layer part of a ceramic compact obtained in Example 2-1.

SEM observation of a cross section of an aluminum oxide film obtained, as shown in FIG. 17, confirmed that the aluminum oxide particle overall formed a film. The filling density of the aluminum oxide particle measured by bulk density method was 88%.

3. Production Method of Ceramic Compact

Example 3-1

An aluminum oxide particle in non-uniformly shape and with an average particle diameter of 0.5 µm and an aqueous solution in which polyvinyl alcohol was dissolved onto water were mixed to prepare a slurry. The contents of the aluminum oxide particle and the polyvinyl alcohol contained in the slurry were 55% by volume and 4% by volume, respectively.

Subsequently, the slurry was dripped onto the surface of a plate-like substrate (20 mm×20 mm×2 mm) consisting of an aluminum oxide sintered compact and applied to the entire surface of the plate-like substrate using doctor blade to obtain a film-coated substrate having a thickness of 0.5 mm. Then, the film-coated substrate was allowed to stand in ambient air at 20° C. for 10 minutes.

Thereafter, the film-coated substrate was placed on a protrusion of a plate-like stainless heater at a surface temperature of 500° C. by infrared heating beforehand and a stainless heater 70 having a semi-spherical protrusion formed in the center with a height of 1.2 mm and 2 mm in diameter, and the lower surface of a substrate 75 was locally heated for 10 minutes to degrease a coating film 80 (see FIG. 19). Accordingly, an aluminum oxide film having a thickness of approximately 300 µm was obtained. Variations of film thickness were not found.

Figure 21:
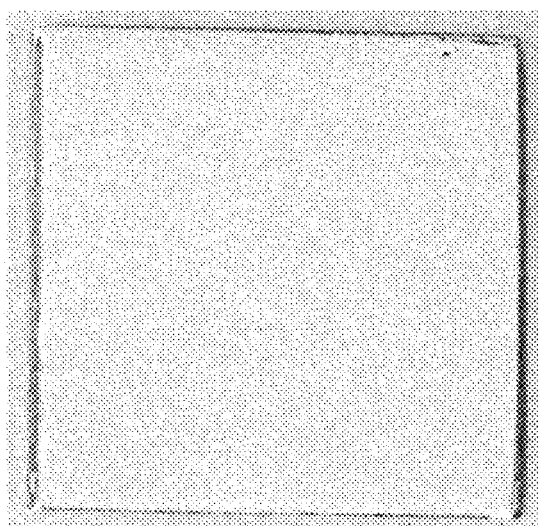
FIG. 21 is an image showing a ceramic compact obtained in Example 3-1.
Figure 22:
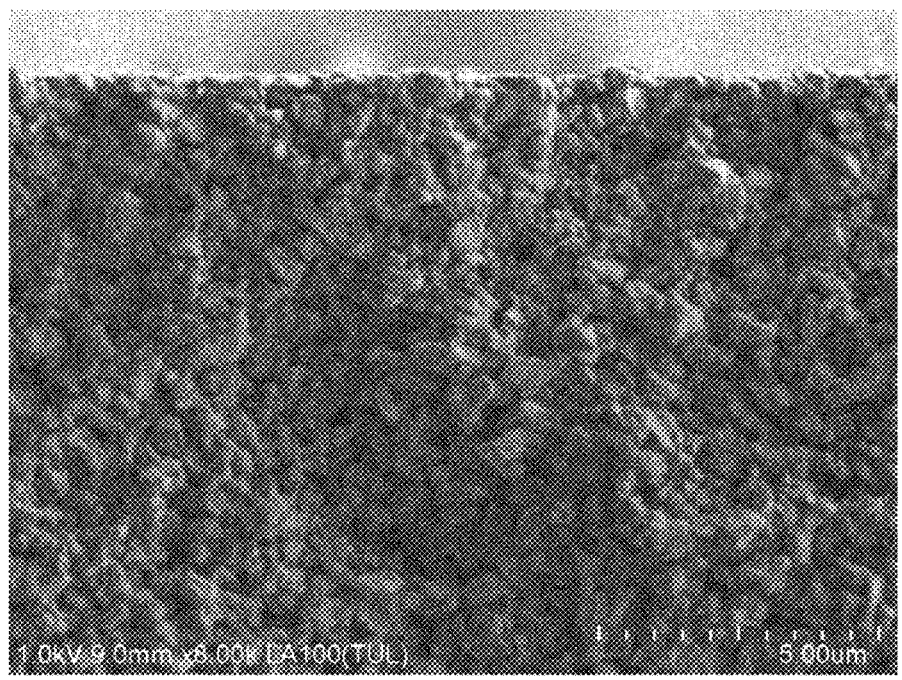
FIG. 22 is an image showing a cross-sectional view of a ceramic compact obtained in Example 3-1.

The plan view and cross-sectional view of an aluminum oxide film obtained were observed with SEM. The plan image in FIG. 21 demonstrates no deformation or cracks. A cross-sectional image after preparing a fractured surface in FIG. 22 demonstrates an aluminum oxide particle overall forms a film with high-density. The filling density of the aluminum oxide particle measured by bulk density method was 92%.

Example 3-2

The same procedure as in Example 3-1 was conducted except for preparation of a plate-like substrate consisting of an aluminum oxide sintered compact (50 mm×50 mm×1 mm) and a coating film thickness of 0.3 mm to obtain an aluminum oxide film having a thickness of approximately 185 μm.

Figure 23:
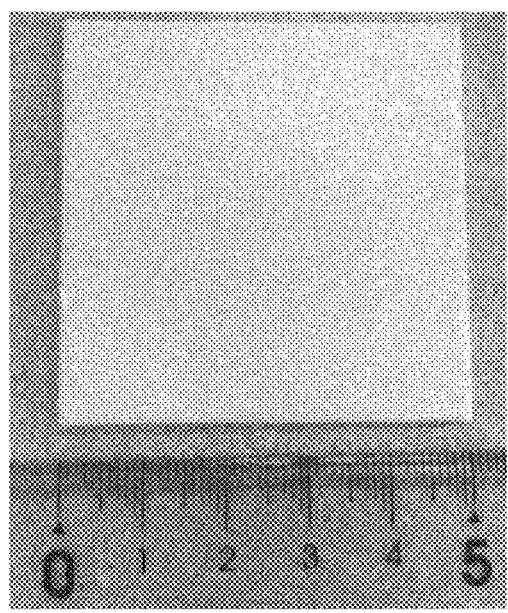
FIG. 23 is an image showing a ceramic compact obtained in Example 3-2.

As shown in FIG. 23, an aluminum oxide film obtained showed no deformation or cracks, and deviations of film thickness were not found. The filling density of the aluminum oxide particle measured by bulk density method was 91%.

Comparative Example 3-1

A film-coated substrate prepared as in Example 3-1 was placed on a heat-resistant brick disposed in a muffle furnace. Then, the film-coated substrate was heated in ambient air at 80° C. for 2 hours, and subsequently at 500° C. for 2 hours to obtain an aluminum oxide film having an average thickness of approximately 300 μm.

Figure 24:
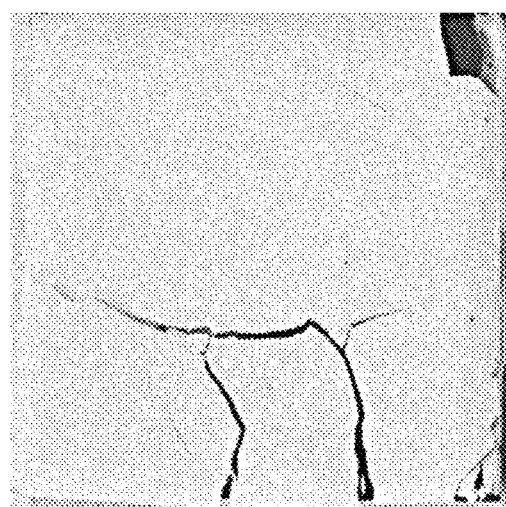
FIG. 24 is an image showing a ceramic compact obtained in Comparative Example 3-1.

The aluminum oxide film obtained, as shown in FIG. 24, showed cracks, and deformation in thickness direction.

INDUSTRIAL APPLICABILITY

The sintering method of the present invention can sinter a ceramic for sintering for a shorter period of time than the case where a ceramic for sintering is directly irradiated with laser. Accordingly, the method can precisely and promptly produce a sintered material whose sintered part corresponds to a desired part in a non-sintered part consisting of a ceramic for sintering, or a shaped article, and an article having microscopic shape.

The production method of a ceramic compact in the first embodiment of the present invention can lead to a ceramic compact for producing a sintered compact by baking; a ceramic compact such as a particle-arrayed body, and a particle filled body; and the like.

The production method of a ceramic compact in the second embodiment of the present invention can lead to a ceramic compact for producing a sintered compact by baking; a ceramic compact such as a particle-arrayed body, and a particle filled body; and the like.

REFERENCE SIGNS LIST 10, 10A, 10B, 10C, 10D: Lamination,
11: Base part,
12: Article consisting of ceramic for sintering,
12A, 12B, 12C, 12D: Non-sintered part (non-sintered layer),
13A, 13B, 13C, 13D: Non-sintered part,
14, 14A, 14B, 14C, 14D: Carbon powder-containing layer,
16, 16A, 16B, 16C, 16D: Sintered part,
20: Article having sintered part (sintered material),
30: Laser irradiating means,
40A, 40B: Article having three-dimensional sintered part (molded article),
50: Production apparatus of a ceramic compact (first production apparatus),
52: Slurry spraying part,
54: Heat source,
56: Substrate placing stage,
60: Substrate,
70: Heat source (Heat-treating part),
71: Heat source,
75: Substrate,
78: Insulating material,
80: Coating film,
82: Ceramic compact.

What is claimed is:

1. A method for producing a ceramic compact on a substrate, the method comprising:
    heating the substrate at a temperature ranging from 150° C. to less than 400° C. to prepare a heated substrate,
    spraying a surface of the heated substrate with a slurry comprising a plurality of ceramic particles, a liquid dispersion medium, and a dispersant;
    and volatilizing the liquid dispersion medium;
    wherein a concentration of the ceramic particle in the slurry is from 20% to 40% by volume, and
    wherein a content of the dispersant in the slurry is from 0.1 to 10 parts by volume based on 100 parts by volume of the ceramic particles.

2. The method according to claim 1,
    wherein the dispersion medium comprises a water or an alcohol.

3. The method according to claim 1, wherein the substrate is made of at least one material selected from the group consisting of a metal and a ceramic.

4. The method according to claim 1, wherein the ceramic particles have an average diameter of a range from 100 nm to 10 μm.

5. The method according to claim 1, wherein the slurry does not contain a polymer binder.

6. The method according to claim 1, wherein the resulting ceramic compact has a ceramic particle filling density of 85% or more based on bulk density.

* * * * *